US012717910B2

(12) United States Patent
Kosan et al.

(10) Patent No.: US 12,717,910 B2
(45) Date of Patent: Aug. 25, 2026

(54) SYSTEM, METHOD, AND COMPUTER PROGRAM PRODUCT FOR DYNAMIC PEER GROUP ANALYSIS OF SYSTEMATIC CHANGES IN LARGE SCALE DATA

(71) Applicant: Visa International Service Association, San Francisco, CA (US)

(72) Inventors: Mert Kosan, Austin, TX (US); Shubham Agrawal, Round Rock, TX (US); Linyun He, Cedar Park, TX (US); Yuhang Wu, Jersey City, NJ (US); Yu-San Lin, San Francisco, CA (US); Lan Wang, Sunnyvale, CA (US); Fei Wang, Fremont, CA (US); Chiranjeet Chetia, Round Rock, TX (US)

(73) Assignee: Visa International Service Association, San Francisco, CA (US)

( * ) Notice: Subject to any disclaimer, the term of this patent is extended or adjusted under 35 U.S.C. 154(b) by 14 days.

(21) Appl. No.: 18/846,405

(22) PCT Filed: Mar. 22, 2023

(86) PCT No.: PCT/US2023/015905
§ 371 (c)(1),
(2) Date: Sep. 12, 2024

(87) PCT Pub. No.: WO2023/183387
PCT Pub. Date: Sep. 28, 2023

(65) Prior Publication Data

US 2025/0181712 A1 Jun. 5, 2025

Related U.S. Application Data

(60) Provisional application No. 63/322,947, filed on Mar. 23, 2022.

(51) Int. Cl.
*G06F 21/55* (2013.01)

(52) U.S. Cl.
CPC .......... *G06F 21/554* (2013.01); *G06F 21/552* (2013.01)

(58) Field of Classification Search
CPC .... G06F 21/554; G06F 21/552; G06F 21/577; H04L 41/064; H04L 41/065
See application file for complete search history.

(56) References Cited

U.S. PATENT DOCUMENTS 9,516,053 B1 * 12/2016 Muddu ................ G06V 10/225
9,521,160 B2 12/2016 Ng et al.

(Continued)

OTHER PUBLICATIONS

Abdallah et al., "Fraud detection system: A survey", Journal of Network and Computer Applications, 2016, pp. 90-113, vol. 68.

(Continued)

*Primary Examiner* — Javier O Guzman
(74) *Attorney, Agent, or Firm* — The Webb Law Firm

(57) ABSTRACT

Provided are systems, methods, and computer program products for dynamic peer group analysis for systematic changes in large scale data. Data associated with a plurality of entities is received and a relational graph is generated based on the data. A target entity is selected and a peer group for the target entity is determined based on the relational graph. An average and a standard deviation of the risk scores of the peer group are calculated and used to determine whether a systematic change in the behavior of the peer group has occurred. Whether a change in behavior of the target entity is a false anomaly or a true anomaly is determined based on whether a systematic change in the behavior of the peer group has occurred. An action is performed based on whether the change in behavior of the target entity is a false anomaly or a true anomaly.

18 Claims, 11 Drawing Sheets

(56) References Cited

U.S. PATENT DOCUMENTS

| | | | | |
|---|---|---|---|---|
| 10,511,635 | B2 | 12/2019 | Ng et al. | |
| 12,189,783 | B2 * | 1/2025 | Cunningham | G06F 21/577 |
| 2013/0247205 | A1 * | 9/2013 | Schrecker | G06F 21/577<br>726/25 |
| 2016/0203575 | A1 * | 7/2016 | Madhu | H04L 63/12<br>705/319 |
| 2017/0063888 | A1 * | 3/2017 | Muddu | H04L 63/20 |
| 2017/0063896 | A1 * | 3/2017 | Muddu | H04L 43/00 |
| 2017/0063910 | A1 * | 3/2017 | Muddu | H04L 43/00 |
| 2017/0063912 | A1 * | 3/2017 | Muddu | G06N 5/022 |
| 2018/0219897 | A1 * | 8/2018 | Muddu | H04L 43/062 |
| 2019/0173893 | A1 * | 6/2019 | Muddu | H04L 63/1433 |
| 2022/0014533 | A1 * | 1/2022 | Almaz | H04L 43/16 |
| 2022/0030019 | A1 * | 1/2022 | Neuvirth | G06F 16/2477 |

OTHER PUBLICATIONS

Akoglu et al., “Graph based anomaly detection and description: a survey”, Data mining and knowledge discovery, 2015, pp. 626-688, vol. 29.

Aminikhanghahi et al., “A survey of methods for time series change point detection”, Knowledge and information systems, 2017, pp. 339-367, vol. 51, issue No. 2.

Assadhan et al., “A robust anomaly detection method using a constant false alarm rate approach”, Multimedia Tools and Applications, 2020, pp. 1-24.

Atefeh et al., “A survey of techniques for event detection in twitter”, Computational Intelligence, 2015, pp. 132-164, vol. 31, Issue 1.

Blazquez-Garcia et al., “A review on outlier/ anomaly detection in time series data”, ACM computing surveys, arXiv:2002.0436, 2020, pp. 1-32.

Bolton et al., “Peer group analysis-local anomaly detection in longitudinal data”, Technical Report, 2001 pp. 1-15.

Bulusu et al., “Anomalous example detection in deep learning: A survey”, IEEE Access, 2020, pp. 132330-132347, vol. 8.

Chandola et al., “Anomaly detection: A survey”, ACM computing surveys (CSUR), 2009, pp. 1-72, vol. 41, Issue No. 3.

Dwivedi et al., “Building an efficient intrusion detection system using grasshopper optimization algorithm for anomaly detection”, Cluster Computing, 2021, pp. 1-20.

Ennett et al., “Peer group structure and adolescent cigarette smoking: A social network analysis”, Journal of health and social behavior, 1993, pp. 226-236, vol. 34.

Ferdousi et al., “Anomaly detection using unsupervised profiling method in time series data”, Conference: ADBIS 2006, Advances in Databases and Information Systems, 2006, pp. 1-13.

Friedkin et al., “Peer group influence”, Sociological Methods & Research, 1990, pp. 122-143, vol. 19, No. 1.

Hochenbaum et al., “Automatic anomaly detection in the cloud via statistical learning”, 10.48550/arXiv.1704.07706, 2017, pp. 1-14.

Kadri et al., “Seasonal arma-based spc charts for anomaly detection: Application to emergency department systems”, Neurocomputing, 2016, pp. 2102-2114, vol. 173.

Kim et al., “Stock fraud detection using peer group analysis”, Expert Systems with Applications, 2012, pp. 8986-8992, vol. 39, Issue No. 10.

Ko et al., “A new autoencoder based dynamic threshold to reduce false alarm rates for anomaly detection of steam turbines”, Expert Systems with Applications, 2022, pp. 1-20, vol. 189.

Kosan et al., “Event detection on dynamic graphs”, Association for the Advancement of Artificial Intelligence, arXiv:2110.12148, 2023, pp. 1-11.

Pimentel et al., “A review of novelty detection”, Signal Processing, 2014, pp. 215-249, vol. 99.

Ranshous et al., “Anomaly detection in dynamic networks: a survey”, Wiley Interdisciplinary Reviews: Computational Statistics, 2015, pp. 223-247, vol. 7, No. 3.

Rayana et al., “Less is more: Building selective anomaly ensembles with application to event detection in temporal graphs”, In Proceedings of the 2015 SIAM International Conference on Data Mining, 2015, pp. 622-630.

Weston et al., “Plastic card fraud detection using peer group analysis”, Advances in Data Analysis and Classification, 2008, pp. 45-62, vol. 2.

Al Jallad et al., “Anomaly detection optimization using big data and deep learning to reduce false-positive”, Journal of Big Data, 2020, pp. 1-12, vol. 7, No. 68.

Grill et al., “Reducing false positives of network anomaly detection by local adaptive multivariate smoothing”, Journal of Computer and System Sciences, 2017, pp. 43-57, vol. 83, No. 1.

Martins, “Efficient dynamic time warping for big data streams”, 2018 IEEE International Conference on Big Data (Big Data), IEEE, 2018, pp. 2924-2929.

* cited by examiner

100

200

400

Anomaly Detection System 102

Sort nodes that share a first static characteristic with the target entity to provide a sorted plurality of nodes 420

SYSTEM, METHOD, AND COMPUTER PROGRAM PRODUCT FOR DYNAMIC PEER GROUP ANALYSIS OF SYSTEMATIC CHANGES IN LARGE SCALE DATA

CROSS-REFERENCE TO RELATED APPLICATIONS

This application is the United States national phase of International Patent Application No. PCT/US23/15905 filed on Mar. 22, 2023, and claims priority to U.S. Provisional Patent Application No. 63/322,947, filed on Mar. 23, 2022, the disclosures of which are hereby incorporated by reference in their entireties.

BACKGROUND

1. Technical Field

The present disclosure relates generally to dynamic peer group analysis of systematic changes in large scale data and, in some non-limiting embodiments or aspects, systems, methods, and computer program products for dynamic peer group analysis of systematic changes in large scale data.

2. Technical Considerations

Anomaly detection may refer to a type of statistical analysis that is used to identify data points, events, and/or observations that deviate from a data set's normal behavior. In some instances, an anomaly detection algorithm may be used to analyze a large scale dataset of unlabeled data and determine if an anomaly has occurred.

When using a large scale dataset of unlabeled data, anomaly detection may be performed by assuming that most instances in a large scale data set are normal behavior. An anomaly detection algorithm may be used to determine which instances are outliers and each outlier as an anomaly. The most challenging parts of anomaly detection, when using a large scale dataset of unlabeled data, are reducing the number of false anomaly detections (e.g., false alarms) and detecting anomalies at an early stage (e.g., before an anomaly detection threshold is met).

In some instances anomaly detection techniques may detect normal behaviors as anomalies, resulting in a high number of false anomaly detections. For example, the behavior of a particular entity may seem abnormal during a seasonal period (e.g., a change in the number of daily transactions on a holiday) and be labeled as an anomaly, however, when compared to other similar entities during the same time period, the behavior may appear normal (e.g., not an anomaly). Additionally, some existing anomaly detection techniques may require that a certain anomaly detection threshold is met before an anomaly is detected. For example, an abnormal behavior may fail to be detected as an anomaly until an anomaly level associated with the behavior meets a certain threshold. Requiring the anomaly level associated with the behavior to meet a certain threshold may prevent an anomaly from being detected at an early stage.

SUMMARY

Accordingly, provided are improved systems, devices, products, apparatus, and/or methods for dynamic peer group analysis of systematic changes in large scale data.

In some non-limiting embodiments or aspects, provided is a method for dynamic peer group analysis of systematic changes in large scale data. In some non-limiting embodiments or aspects, the method may include receiving, with at least one processor, data associated with a plurality of entities, the data may include a static characteristic of each entity of the plurality of entities, a dynamic characteristic of each entity of the plurality of entities, and a risk score of each entity of the plurality of entities, and the risk score of each entity of the plurality of entities may indicate a probability of an anomaly occurring with regard to a behavior of that entity. In some non-limiting embodiments or aspects, the method may further include generating, with the at least one processor, a relational graph based on the static characteristic of each entity of the plurality of entities, the relational graph may include a plurality of nodes and a plurality of edges, where each node represents an entity of the plurality of entities, and where each edge is associated with a static characteristic that is shared between two nodes of the plurality of nodes connected by that edge. In some non-limiting embodiments or aspects, the method may further include selecting, with the at least one processor, a target entity from the plurality of entities. In some non-limiting embodiments or aspects, the method may further include determining, with the at least one processor, a peer group of the target entity based on the relational graph. In some non-limiting embodiments or aspects, the method may further include calculating, with the at least one processor, an average of the risk scores of the peer group and a standard deviation of the risk scores of the peer group. In some non-limiting embodiments or aspects, the method may further include determining, with the at least one processor, whether a systematic change in the behavior in the peer group has occurred based on the average of the risk scores of the peer group and the standard deviation of the risk scores of the peer group. In some non-limiting embodiments or aspects, the method may further include determining, with the at least one processor, whether a change in behavior of the target entity is a false anomaly or a true anomaly based on determining that a systematic change in the behavior in the peer group has occurred. In some non-limiting embodiments or aspects, the method may further include performing, with the at least one processor, an action based on determining whether the change in behavior of the target entity is a false anomaly or a true anomaly.

In some non-limiting embodiments or aspects, the method may further include determining a temporal sequence of a value of a dynamic characteristic over a period of time for each entity of the plurality of entities. In some non-limiting embodiments or aspects, the method may further include determining a length of an edge connecting a first node associated with a first entity and a second node associated with a second entity based on the temporal sequences of the first and second entities represented by the first and second nodes, the length of the edge connecting the two nodes may include an indication of a degree of similarity with regard to a dynamic characteristic between the temporal sequence of the first entity and the temporal sequence of the second entity. In some non-limiting embodiments or aspects, the method may further include generating the relational graph based on the length of the edge connecting the first node associated with the first entity and the second node associated with the second entity. In some non-limiting embodiments or aspects, the plurality of nodes is a first plurality of nodes, and determining the peer group of the target entity may include selecting a target node from the plurality of nodes, the target node represents the target entity; sorting a second plurality of nodes, the second plurality of nodes is a subset of nodes of the first plurality of nodes, the subset of nodes may include nodes that represent a plurality of entities that share a first static characteristic with the target entity. In some non-limiting embodiments or aspects, sorting the second plurality of nodes may include sorting the second plurality of nodes based on a length of an edge connecting the target node to each of the second plurality of nodes to provide a sorted second plurality of nodes; and determining the peer group of the target entity based on the sorted second plurality of nodes. In some non-limiting embodiments or aspects, determining whether a systematic change in the behavior in the peer group has occurred may include generating a ratio of the average of the risk scores of the peer group to the standard deviation of the risk scores of the peer group; determining whether the ratio satisfies a threshold value; and determining that a systematic change in the behavior in the peer group has occurred based on the ratio satisfying the threshold value. In some non-limiting embodiments or aspects, determining whether a systematic change in the behavior in the peer group has occurred may include generating a ratio of the average of the risk scores of the peer group to the standard deviation of the risk scores of the peer group; determining whether the ratio satisfies a threshold value; and determining that a systematic change in the behavior in the peer group has not occurred based on the ratio not satisfying the threshold value. In some non-limiting embodiments or aspects, determining whether the change in behavior of the target entity is a false anomaly or a true anomaly may include determining that the change in the behavior of the target entity is a false anomaly based on determining that a systematic change in the behavior of the peer group has occurred. In some non-limiting embodiments or aspects, performing the action may include performing the action based on determining that the change in behavior of the target entity is a false anomaly. In some non-limiting embodiments or aspects, performing the action based on determining that the change in behavior of the target entity is a false anomaly may include modifying an anomaly detection alert associated with the target entity based on determining that the change in the behavior of the target entity is a false anomaly; or transmitting an anomaly detection alert associated with the target entity based on determining that the change in the behavior of the target entity is a false anomaly.

In some non-limiting embodiments or aspects, provided is a system for dynamic peer group analysis of systematic changes in large scale data. In some non-limiting embodiments or aspects, the system may include at least one processor programmed or configured to receive data associated with a plurality of entities, the data may include a static characteristic of each entity of the plurality of entities, a dynamic characteristic of each entity of the plurality of entities, and a risk score of each entity of the plurality of entities, and the risk score of each entity of the plurality of entities may indicate a probability of an anomaly occurring with regard to a behavior of that entity. In some non-limiting embodiments or aspects, at least one processor may be further programmed or configured to generate a relational graph based on the static characteristic of each entity of the plurality of entities, the relational graph may include a plurality of nodes and a plurality of edges, where each node represents an entity of the plurality of entities, and where each edge is associated with a static characteristic that is shared between two nodes of the plurality of nodes connected by that edge. In some non-limiting embodiments or aspects, at least one processor may be further programmed or configured to select a target entity from the plurality of entities. In some non-limiting embodiments or aspects, at least one processor may be further programmed or configured to determine a peer group of the target entity based on the relational graph. In some non-limiting embodiments or aspects, at least one processor may be further programmed or configured to calculate an average of the risk scores of the peer group and a standard deviation of the risk scores of the peer group. In some non-limiting embodiments or aspects, at least one processor may be further programmed or configured to determine whether a systematic change in the behavior in the peer group has occurred based on the average of the risk scores of the peer group and the standard deviation of the risk scores of the peer group. In some non-limiting embodiments or aspects, at least one processor may be further programmed or configured to determine whether a change in behavior of the target entity is a false anomaly or a true anomaly based on determining that a systematic change in the behavior in the peer group has occurred. In some non-limiting embodiments or aspects, at least one processor may be further programmed or configured to perform an action based on determining whether the change in behavior of the target entity is a false anomaly or a true anomaly.

In some non-limiting embodiments or aspects, at least one processor may be further programmed or configured to determine a temporal sequence of a value of a dynamic characteristic over a period of time for each entity of the plurality of entities; and determine a length of an edge connecting a first node associated with a first entity and a second node associated with a second entity based on the temporal sequences of the first and second entities represented by the first and second nodes, the length of the edge connecting the two nodes may include an indication of a degree of similarity with regard to a dynamic characteristic between the temporal sequence of the first entity and the temporal sequence of the second entity. In some non-limiting embodiments or aspects, when generating the relational graph, the at least one processor may be further programmed or configured to: generate the relational graph based on the length of the edge connecting the first node associated with the first entity and the second node associated with the second entity. In some non-limiting embodiments or aspects, the plurality of nodes is a first plurality of nodes. In some non-limiting embodiments or aspects, when determining the peer group of the target entity, the at least one processor may be programmed or configured to: select a target node from the plurality of nodes, the target node represents the target entity; sort a second plurality of nodes, the second plurality of nodes is a subset of nodes of the first plurality of nodes, the subset of nodes may include nodes that represent a plurality of entities that share a first static characteristic with the target entity. In some non-limiting embodiments or aspects, when sorting the second plurality of nodes, the at least one processor may be programmed or configured to: sort the second plurality of nodes based on a length of an edge connecting the target node to each of the second plurality of nodes to provide a sorted second plurality of nodes; and determine the peer group of the target entity based on the sorted second plurality of nodes. In some non-limiting embodiments or aspects, when determining whether a systematic change in the behavior in the peer group has occurred, the at least one processor may be programmed or configured to: generate a ratio of the average of the risk scores of the peer group to the standard deviation of the risk scores of the peer group; determine whether the ratio satisfies a threshold value; and determine that a systematic change in the behavior in the peer group has occurred based on the ratio satisfying the threshold value. In some non-limiting embodiments or aspects, when determining whether a systematic change in the behavior in the peer group has occurred, the at least one processor may be programmed or configured to: generate a ratio of the average of the risk scores of the peer group to the standard deviation of the risk scores of the peer group; determine whether the ratio satisfies a threshold value; and determine that a systematic change in the behavior in the peer group has not occurred based on the ratio not satisfying the threshold value. In some non-limiting embodiments or aspects, when determining whether the change in behavior of the target entity is a false anomaly or a true anomaly, the at least one processor may be programmed or configured to: determine that the change in the behavior of the target entity is a false anomaly based on determining that a systematic change in the behavior of the peer group has occurred; and wherein, when performing the action, the at least one processor may be programmed or configured to: perform the action based on determining that the change in behavior of the target entity is a false anomaly. In some non-limiting embodiments or aspects, when performing the action based on determining that the change in behavior of the target entity is a false anomaly, the at least one processor may be programmed or configured to: modify an anomaly detection alert associated with the target entity based on determining that the change in the behavior of the target entity is a false anomaly; or transmit an anomaly detection alert associated with the target entity based on determining that the change in the behavior of the target entity is a false anomaly.

In some non-limiting embodiments or aspects, provided is a computer program product for dynamic peer group analysis of systematic changes in large scale data. In some non-limiting embodiments or aspects, the computer program product may include at least one non-transitory computer-readable medium including one or more instructions that, when executed by at least one processor, cause the at least one processor to: receive data associated with a plurality of entities, the data may include a static characteristic of each entity of the plurality of entities, a dynamic characteristic of each entity of the plurality of entities, and a risk score of each entity of the plurality of entities, and the risk score of each entity of the plurality of entities may indicate a probability of an anomaly occurring with regard to a behavior of that entity. In some non-limiting embodiments or aspects, the one or more instructions may cause the at least one processor to generate a relational graph based on the static characteristic of each entity of the plurality of entities, the relational graph may include a plurality of nodes and a plurality of edges, wherein each node represents an entity of the plurality of entities, and wherein each edge is associated with a static characteristic that is shared between two nodes of the plurality of nodes connected by that edge. In some non-limiting embodiments or aspects, the one or more instructions may cause the at least one processor to select a target entity from the plurality of entities. In some non-limiting embodiments or aspects, the one or more instructions may cause the at least one processor to determine a peer group of the target entity based on the relational graph. In some non-limiting embodiments or aspects, the one or more instructions may cause the at least one processor to calculate an average of the risk scores of the peer group and a standard deviation of the risk scores of the peer group. In some non-limiting embodiments or aspects, the one or more instructions may cause the at least one processor to determine whether a systematic change in the behavior in the peer group has occurred based on the average of the risk scores of the peer group and the standard deviation of the risk scores of the peer group. In some non-limiting embodiments or aspects, the one or more instructions may cause the at least one processor to determine whether a change in behavior of the target entity is a false anomaly or a true anomaly based on determining that a systematic change in the behavior in the peer group has occurred. In some non-limiting embodiments or aspects, the one or more instructions may cause the at least one processor to perform an action based on determining whether the change in behavior of the target entity is a false anomaly or a true anomaly.

In some non-limiting embodiments or aspects, the one or more instructions may further cause the at least one processor to: determine a temporal sequence of a value of a dynamic characteristic over a period of time for each entity of the plurality of entities; and determine a length of an edge connecting a first node associated with a first entity and a second node associated with a second entity based on the temporal sequences of the first and second entities represented by the first and second nodes, the length of the edge connecting the two nodes may include an indication of a degree of similarity with regard to a dynamic characteristic between the temporal sequence of the first entity and the temporal sequence of the second entity. In some non-limiting embodiments or aspects, the one or more instructions that cause the at least one processor to generate the relational graph, may further cause the at least one processor to generate the relational graph based on the length of the edge connecting the first node associated with the first entity and the second node associated with the second entity. In some non-limiting embodiments or aspects, the plurality of nodes is a first plurality of nodes. In some non-limiting embodiments or aspects, the one or more instructions that cause the at least one processor to determine the peer group of the target entity, may further cause the at least one processor to: select a target node from the plurality of nodes, the target node represents the target entity; sort a second plurality of nodes, the second plurality of nodes is a subset of nodes of the first plurality of nodes, the subset of nodes may include nodes that represent a plurality of entities that share a first static characteristic with the target entity. In some non-limiting embodiments or aspects, the one or more instructions that cause the at least one processor to sort the second plurality of nodes, may further cause the at least one processor to: sort the second plurality of nodes based on a length of an edge connecting the target node to each of the second plurality of nodes to provide a sorted second plurality of nodes; and determine the peer group of the target entity based on the sorted second plurality of nodes. In some non-limiting embodiments or aspects, the one or more instructions that cause the at least one processor to determine whether a systematic change in the behavior in the peer group has occurred, may further cause the at least one processor to: generate a ratio of the average of the risk scores of the peer group to the standard deviation of the risk scores of the peer group; determine whether the ratio satisfies a threshold value; and determine that a systematic change in the behavior in the peer group has occurred based on the ratio satisfying the threshold value; or determine that a systematic change in the behavior in the peer group has not occurred based on the ratio not satisfying the threshold value. In some non-limiting embodiments or aspects, the one or more instructions that cause the at least one processor to determine whether the change in behavior of the target entity is a false anomaly or a true anomaly, may further cause the at least one processor to: determine that the change in the behavior of the target entity is a false anomaly based on determining that a systematic change in the behavior of the peer group has occurred. In some non-limiting embodiments or aspects, the one or more instructions that cause the at least one processor to perform the action, may further cause the at least one processor to: perform the action based on determining that the change in behavior of the target entity is a false anomaly. In some non-limiting embodiments or aspects, the one or more instructions that cause the at least one processor to perform the action based on determining that the change in behavior of the target entity is a false anomaly may further cause the at least one processor to: modify an anomaly detection alert associated with the target entity based on determining that the change in the behavior of the target entity is a false anomaly; or transmit an anomaly detection alert associated with the target entity based on determining that the change in the behavior of the target entity is a false anomaly.

Further non-limiting embodiments or aspects will be set forth in the following numbered clauses:

Clause 1: A method, comprising: receiving, with at least one processor, data associated with a plurality of entities, wherein the data comprises a static characteristic of each entity of the plurality of entities, a dynamic characteristic of each entity of the plurality of entities, and a risk score of each entity of the plurality of entities, and wherein the risk score of each entity of the plurality of entities indicates a probability of an anomaly occurring with regard to a behavior of that entity; generating, with the at least one processor, a relational graph based on the static characteristic of each entity of the plurality of entities, the relational graph comprising a plurality of nodes and a plurality of edges, wherein each node represents an entity of the plurality of entities, and wherein each edge is associated with a static characteristic that is shared between two nodes of the plurality of nodes connected by that edge; selecting, with the at least one processor, a target entity from the plurality of entities; determining, with the at least one processor, a peer group of the target entity based on the relational graph; calculating, with the at least one processor, an average of the risk scores of the peer group and a standard deviation of the risk scores of the peer group; determining, with the at least one processor, whether a systematic change in the behavior in the peer group has occurred based on the average of the risk scores of the peer group and the standard deviation of the risk scores of the peer group; determining, with the at least one processor, whether a change in behavior of the target entity is a false anomaly or a true anomaly based on determining that a systematic change in the behavior in the peer group has occurred; and performing, with the at least one processor, an action based on determining whether the change in behavior of the target entity is a false anomaly or a true anomaly.

Clause 2: The method of clause 1, further comprising: determining a temporal sequence of a value of a dynamic characteristic over a period of time for each entity of the plurality of entities; and determining a length of an edge connecting a first node associated with a first entity and a second node associated with a second entity based on the temporal sequences of the first and second entities represented by the first and second nodes, wherein the length of the edge connecting the two nodes comprises an indication of a degree of similarity with regard to a dynamic characteristic between the temporal sequence of the first entity and the temporal sequence of the second entity; and wherein generating the relational graph comprises: generating the relational graph based on the length of the edge connecting the first node associated with the first entity and the second node associated with the second entity.

Clause 3: The method of clause 1 or 2, wherein the plurality of nodes is a first plurality of nodes, and wherein determining the peer group of the target entity comprises: selecting a target node from the plurality of nodes, wherein the target node represents the target entity; sorting a second plurality of nodes, wherein the second plurality of nodes is a subset of nodes of the first plurality of nodes, wherein the subset of nodes comprises nodes that represent a plurality of entities that share a first static characteristic with the target entity, and wherein sorting the second plurality of nodes comprises: sorting the second plurality of nodes based on a length of an edge connecting the target node to each of the second plurality of nodes to provide a sorted second plurality of nodes; and determining the peer group of the target entity based on the sorted second plurality of nodes.

Clause 4: The method of any of clauses 1-3, wherein determining whether a systematic change in the behavior in the peer group has occurred comprises: generating a ratio of the average of the risk scores of the peer group to the standard deviation of the risk scores of the peer group; determining whether the ratio satisfies a threshold value; and determining that a systematic change in the behavior in the peer group has occurred based on the ratio satisfying the threshold value.

Clause 5: The method of any of clauses 1-4, wherein determining whether a systematic change in the behavior in the peer group has occurred comprises: generating a ratio of the average of the risk scores of the peer group to the standard deviation of the risk scores of the peer group; determining whether the ratio satisfies a threshold value; and determining that a systematic change in the behavior in the peer group has not occurred based on the ratio not satisfying the threshold value.

Clause 6: The method of any of clauses 1-5, wherein determining whether the change in behavior of the target entity is a false anomaly or a true anomaly comprises: determining that the change in the behavior of the target entity is a false anomaly based on determining that a systematic change in the behavior of the peer group has occurred; and wherein performing the action comprises: performing the action based on determining that the change in behavior of the target entity is a false anomaly.

Clause 7: The method of any of clauses 1-6, wherein performing the action based on determining that the change in behavior of the target entity is a false anomaly comprises: modifying an anomaly detection alert associated with the target entity based on determining that the change in the behavior of the target entity is a false anomaly; or transmitting an anomaly detection alert associated with the target entity based on determining that the change in the behavior of the target entity is a false anomaly.

Clause 8: A system comprising at least one processor programmed or configured to: receive data associated with a plurality of entities, wherein the data comprises a static characteristic of each entity of the plurality of entities, a dynamic characteristic of each entity of the plurality of entities, and a risk score of each entity of the plurality of entities, and wherein the risk score of each entity of the plurality of entities indicates a probability of an anomaly occurring with regard to a behavior of that entity; generate a relational graph based on the static characteristic of each entity of the plurality of entities, the relational graph comprising a plurality of nodes and a plurality of edges, wherein each node represents an entity of the plurality of entities, and wherein each edge is associated with a static characteristic that is shared between two nodes of the plurality of nodes connected by that edge; select a target entity from the plurality of entities; determine a peer group of the target entity based on the relational graph; calculate an average of the risk scores of the peer group and a standard deviation of the risk scores of the peer group; determine whether a systematic change in the behavior in the peer group has occurred based on the average of the risk scores of the peer group and the standard deviation of the risk scores of the peer group; determine whether a change in behavior of the target entity is a false anomaly or a true anomaly based on determining that a systematic change in the behavior in the peer group has occurred; and perform an action based on determining whether the change in behavior of the target entity is a false anomaly or a true anomaly.

Clause 9: The system of clause 8, wherein the at least one processor is further programmed or configured to: determine a temporal sequence of a value of a dynamic characteristic over a period of time for each entity of the plurality of entities; and determine a length of an edge connecting a first node associated with a first entity and a second node associated with a second entity based on the temporal sequences of the first and second entities represented by the first and second nodes, wherein the length of the edge connecting the two nodes comprises an indication of a degree of similarity with regard to a dynamic characteristic between the temporal sequence of the first entity and the temporal sequence of the second entity; and wherein, when generating the relational graph, the at least one processor is further programmed or configured to: generate the relational graph based on the length of the edge connecting the first node associated with the first entity and the second node associated with the second entity.

Clause 10: The system of clause 8 or 9, wherein the plurality of nodes is a first plurality of nodes, and wherein, when determining the peer group of the target entity, the at least one processor is programmed or configured to: select a target node from the plurality of nodes, wherein the target node represents the target entity; sort a second plurality of nodes, wherein the second plurality of nodes is a subset of nodes of the first plurality of nodes, wherein the subset of nodes comprises nodes that represent a plurality of entities that share a first static characteristic with the target entity, and wherein, when sorting the second plurality of nodes, the at least one processor is programmed or configured to: sort the second plurality of nodes based on a length of an edge connecting the target node to each of the second plurality of nodes to provide a sorted second plurality of nodes; and determine the peer group of the target entity based on the sorted second plurality of nodes.

Clause 11: The system of any of clauses 8-10, wherein, when determining whether a systematic change in the behavior in the peer group has occurred, the at least one processor is programmed or configured to: generate a ratio of the average of the risk scores of the peer group to the standard deviation of the risk scores of the peer group; determine whether the ratio satisfies a threshold value; and determine that a systematic change in the behavior in the peer group has occurred based on the ratio satisfying the threshold value.

Clause 12: The system of any of clauses 8-11, wherein, when determining whether a systematic change in the behavior in the peer group has occurred, the at least one processor is programmed or configured to: generate a ratio of the average of the risk scores of the peer group to the standard deviation of the risk scores of the peer group; determine whether the ratio satisfies a threshold value; and determine that a systematic change in the behavior in the peer group has not occurred based on the ratio not satisfying the threshold value.

Clause 13: The system of any of clauses 8-12, wherein, when determining whether the change in behavior of the target entity is a false anomaly or a true anomaly, the at least one processor is programmed or configured to: determine that the change in the behavior of the target entity is a false anomaly based on determining that a systematic change in the behavior of the peer group has occurred; and wherein, when performing the action, the at least one processor is programmed or configured to: perform the action based on determining that the change in behavior of the target entity is a false anomaly.

Clause 14: The system of any of clauses 8-13, wherein, when performing the action based on determining that the change in behavior of the target entity is a false anomaly, the at least one processor is programmed or configured to: modify an anomaly detection alert associated with the target entity based on determining that the change in the behavior of the target entity is a false anomaly; or transmit an anomaly detection alert associated with the target entity based on determining that the change in the behavior of the target entity is a false anomaly.

Clause 15: A computer program product comprising at least one non-transitory computer-readable medium including one or more instructions that, when executed by at least one processor, cause the at least one processor to: receive data associated with a plurality of entities, wherein the data comprises a static characteristic of each entity of the plurality of entities, a dynamic characteristic of each entity of the plurality of entities, and a risk score of each entity of the plurality of entities, and wherein the risk score of each entity of the plurality of entities indicates a probability of an anomaly occurring with regard to a behavior of that entity; generate a relational graph based on the static characteristic of each entity of the plurality of entities, the relational graph comprising a plurality of nodes and a plurality of edges, wherein each node represents an entity of the plurality of entities, and wherein each edge is associated with a static characteristic that is shared between two nodes of the plurality of nodes connected by that edge; select a target entity from the plurality of entities; determine a peer group of the target entity based on the relational graph; calculate an average of the risk scores of the peer group and a standard deviation of the risk scores of the peer group; determine whether a systematic change in the behavior in the peer group has occurred based on the average of the risk scores of the peer group and the standard deviation of the risk scores of the peer group; determine whether a change in behavior of the target entity is a false anomaly or a true anomaly based on determining that a systematic change in the behavior in the peer group has occurred; and perform an action based on determining whether the change in behavior of the target entity is a false anomaly or a true anomaly.

Clause 16: The computer program product of clause 15, wherein the one or more instructions further cause the at least one processor to: determine a temporal sequence of a value of a dynamic characteristic over a period of time for each entity of the plurality of entities; and determine a length of an edge connecting a first node associated with a first entity and a second node associated with a second entity based on the temporal sequences of the first and second entities represented by the first and second nodes, wherein the length of the edge connecting the two nodes comprises an indication of a degree of similarity with regard to a dynamic characteristic between the temporal sequence of the first entity and the temporal sequence of the second entity; and wherein, the one or more instructions that cause the at least one processor to generate the relational graph, further cause the at least one processor to: generate the relational graph based on the length of the edge connecting the first node associated with the first entity and the second node associated with the second entity.

Clause 17: The computer program product of clause 15 or 16, wherein the plurality of nodes is a first plurality of nodes, and wherein, the one or more instructions that cause the at least one processor to determine the peer group of the target entity, further cause the at least one processor to: select a target node from the plurality of nodes, wherein the target node represents the target entity; sort a second plurality of nodes, wherein the second plurality of nodes is a subset of nodes of the first plurality of nodes, wherein the subset of nodes comprises nodes that represent a plurality of entities that share a first static characteristic with the target entity, and wherein, the one or more instructions that cause the at least one processor to sort the second plurality of nodes, further cause the at least one processor to: sort the second plurality of nodes based on a length of an edge connecting the target node to each of the second plurality of nodes to provide a sorted second plurality of nodes; and determine the peer group of the target entity based on the sorted second plurality of nodes.

Clause 18: The computer program product of any of clauses 15-17, wherein, the one or more instructions that cause the at least one processor to determine whether a systematic change in the behavior in the peer group has occurred, further cause the at least one processor to: generate a ratio of the average of the risk scores of the peer group to the standard deviation of the risk scores of the peer group; determine whether the ratio satisfies a threshold value; and determine that a systematic change in the behavior in the peer group has occurred based on the ratio satisfying the threshold value; or determine that a systematic change in the behavior in the peer group has not occurred based on the ratio not satisfying the threshold value.

Clause 19: The computer program product of any of clauses 15-18, wherein the one or more instructions that cause the at least one processor to determine whether the change in behavior of the target entity is a false anomaly or a true anomaly, further cause the at least one processor to: determine that the change in the behavior of the target entity is a false anomaly based on determining that a systematic change in the behavior of the peer group has occurred; and wherein, the one or more instructions that cause the at least one processor to perform the action, further cause the at least one processor to: perform the action based on determining that the change in behavior of the target entity is a false anomaly.

Clause 20: The computer program product of any of clauses 15-19, wherein, the one or more instructions that cause the at least one processor to perform the action based on determining that the change in behavior of the target entity is a false anomaly further cause the at least one processor to: modify an anomaly detection alert associated with the target entity based on determining that the change in the behavior of the target entity is a false anomaly; or transmit an anomaly detection alert associated with the target entity based on determining that the change in the behavior of the target entity is a false anomaly.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the present disclosure are explained in greater detail below with reference to the exemplary embodiments that are illustrated in the accompanying schematic figures, in which.

DETAILED DESCRIPTION

Figure 1:
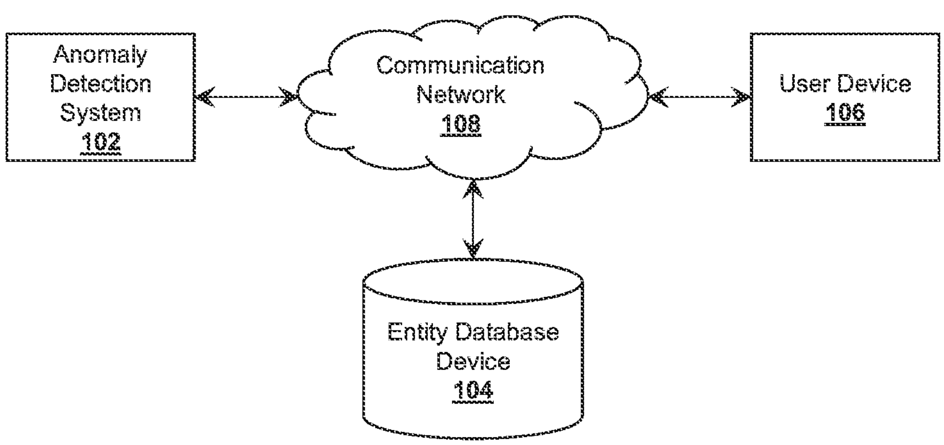
FIG. 1 is a diagram of a non-limiting embodiment or aspect of an environment in which systems, devices, products, apparatus, and/or methods, described herein, may be implemented according to the principles of the present disclosure.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

No aspect, component, element, structure, act, step, function, instruction, and/or the like used herein should be construed as critical or essential unless explicitly described as such. In addition, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. Further, the phrase "based on" is intended to mean "based at least partially on" unless explicitly stated otherwise. In addition, reference to an action being "based on" a condition may refer to the action being "in response to" the condition. For example, the phrases "based on" and "in response to" may, in some non-limiting embodiments or aspects, refer to a condition for automatically triggering an action (e.g., a specific operation of an electronic device, such as a computing device, a processor, and/or the like).

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some non-limiting embodiments or aspects, a message may refer to a network packet (e.g., a data packet and/or the like) that includes data.

As used herein, the terms "issuer," "issuer institution," "issuer bank," or "payment device issuer," may refer to one or more entities that provide accounts to individuals (e.g., users, customers, and/or the like) for conducting payment transactions, such as credit payment transactions and/or debit payment transactions. For example, an issuer institution may provide an account identifier, such as a primary account number (PAN), to a customer that uniquely identifies one or more accounts associated with that customer. In some non-limiting embodiments or aspects, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa®, MasterCard®, American Express®, or any other entity that processes transactions. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments or aspects, may be operated by or on behalf of a transaction service provider.

As used herein, the term "merchant" may refer to one or more entities (e.g., operators of retail businesses) that provide goods and/or services, and/or access to goods and/or services, to a user (e.g., a customer, a consumer, and/or the like) based on a transaction, such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, the term "acquirer" may refer to an entity licensed by the transaction service provider and approved by the transaction service provider to originate transactions (e.g., payment transactions) involving a payment device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments or aspects, the acquirer may be authorized by the transaction service provider to assign merchant or service providers to originate transactions involving a payment device associated with the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by the acquirer's payment facilitators, and/or the like. In some non-limiting embodiments or aspects, an acquirer may be a financial institution, such as a bank.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the terms "client" and "client device" may refer to one or more computing devices, such as processors, storage devices, and/or similar computer components, that access a service made available by a server. In some non-limiting embodiments or aspects, a client device may include a computing device configured to communicate with one or more networks and/or facilitate transactions such as, but not limited to, one or more desktop computers, one or more portable computers (e.g., tablet computers), one or more mobile devices (e.g., cellular phones, smartphones, personal digital assistant, wearable devices, such as watches, glasses, lenses, and/or clothing, and/or the like), and/or other like devices. Moreover, the term "client" may also refer to an entity that owns, utilizes, and/or operates a client device for facilitating transactions with another entity.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system."

As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different device, server, or processor, and/or a combination of devices, servers, and/or processors. For example, as used in the specification and the claims, a first device, a first server, or a first processor that is recited as performing a first step or a first function may refer to the same or different device, server, or processor recited as performing a second step or a second function.

Non-limiting embodiments or aspects of the present disclosure are directed to systems, methods, and computer program products for dynamic peer group analysis of systematic changes in large scale data. In some non-limiting embodiments or aspects, an anomaly detection system may receive data associated with a plurality of entities, where the data may include a static characteristic of each entity of the plurality of entities, a dynamic characteristic of each entity of the plurality of entities, and a risk score of each entity of the plurality of entities, and the risk score of each entity of the plurality of entities may indicate a probability of an anomaly occurring with regard to a behavior of that entity. In some non-limiting embodiments or aspects, the anomaly detection system may be programmed or configured to generate a relational graph based on static characteristics of each entity of the plurality of entities. The relational graph may include a plurality of nodes and a plurality of edges. In some non-limiting embodiments or aspects, each node may represent an entity of the plurality of entities and each edge may be associated with a static characteristic that is shared between two nodes of the plurality of nodes connected by an edge. In some non-limiting embodiments or aspects, the anomaly detection system may be programmed or configured to select a target entity from the plurality of entities. In some non-limiting embodiments or aspects, the anomaly detection system may determine a peer group of the target entity based on the relational graph. In some non-limiting embodiments or aspects, anomaly detection system may calculate an average of the risk scores of the peer group and/or a standard deviation of the risk scores of the peer group. In some non-limiting embodiments or aspects, the anomaly detection system may determine whether a systematic change in the behavior of the peer group has occurred. For example, the anomaly detection system may determine whether a systematic change in the behavior of the peer group has occurred based on the average of the risk scores of the peer group and the standard deviation of the risk scores of the peer group. In some non-limiting embodiments or aspects, the anomaly detection system may determine whether a change in behavior of the target entity is a false anomaly or a true anomaly and may performing an action based on determining whether the change in behavior of the target entity is a false anomaly or a true anomaly.

In some non-limiting embodiments or aspects, the anomaly detection system may determine a temporal sequence of a value of a dynamic characteristic over a period of time for each entity of the plurality of entities and/or determine a length of an edge connecting a first node associated with a first entity and a second node associated with a second entity based on the temporal sequences of the first and second entities represented by the first and second nodes. The length of the edge connecting the two nodes may include an indication of a degree of similarity with regard to a dynamic characteristic between the temporal sequence of the first entity and the temporal sequence of the second entity. In some non-limiting embodiments or aspects, the anomaly detection system may generate the relational graph based on the length of the edge connecting the first node associated with the first entity and the second node associated with the second entity.

In some non-limiting embodiments or aspects, the plurality of nodes may be a first plurality of nodes and when determining the peer group of the target entity, the anomaly detection system may select a target node from the plurality of nodes, sort a second plurality of nodes, and determine the peer group of the target entity based on the sorted second plurality of nodes. In some non-limiting embodiments or aspects, the target node may represent the target entity, the second plurality of nodes may be a subset of nodes of the first plurality of nodes, where the subset of nodes may include nodes that represent a plurality of entities that share a first static characteristic with the target entity (e.g., a peer group). In some non-limiting embodiments or aspects, when sorting the second plurality of nodes, the anomaly detection system may sort the second plurality of nodes based on a length of an edge connecting the target node to each of the second plurality of nodes to provide a sorted second plurality of nodes.

In some non-limiting embodiments or aspects, when determining whether a systematic change in the behavior of the peer group has occurred, the anomaly detection system may generate a ratio of the average of the risk scores of the peer group to the standard deviation of the risk scores of the peer group, determine whether the ratio satisfies a threshold value, and determine that a systematic change in the behavior in the peer group has occurred based on the ratio satisfying the threshold value or determine that a systematic change in the behavior of the peer group has not occurred based on the ratio not satisfying the threshold. In some non-limiting embodiments or aspects, when determining whether the change in the behavior of the target entity is a false anomaly or a true anomaly, the anomaly detection system may determine that the change in the behavior of the target entity is a false anomaly based on determining that a systematic change in the behavior of the peer group has occurred. In some non-limiting embodiments or aspects, when performing the action, the anomaly detection system may perform the action based on determining that the change in behavior of the target entity is a false anomaly. In some non-limiting embodiments or aspects, when performing the action, the anomaly detection system may modify an anomaly detection alert associated with the target entity based on determining that the change in the behavior of the target entity is a false anomaly and/or transmit an anomaly detection alert associated with the target entity based on determining that the change in the behavior of the target entity is a false anomaly.

In this way, the anomaly detection system may reduce a number of false anomaly detections (e.g., false alarms) in large scale data by performing a dynamic peer group analysis of entities within a peer group (e.g., group of similar entities. The anomaly detection system may determine whether a change in behavior of an entity within a peer group is a systematic change within the peer group (e.g., a normal behavior occurring within the peer group), and if so, the system may determine that the change in behavior is a false anomaly detection. For example, the change in a behavior of a particular entity may, on its own, seem abnormal (e.g., a change in the number of daily transactions), however, by comparing the change in behavior of the entity to the behavior of other entities within the peer group, the system may determine that the change is systematic (e.g., the number of daily transactions changed due to a holiday). In addition, the anomaly detection system may detect anomalies at an early stage (e.g., before an anomaly detection threshold is met). For example, if the system determines that the change in behavior of an entity of the peer group is not a systematic change, the system may then determine if the change in behavior is either a false anomaly detection or an early anomaly detection. Further, the anomaly detection system may be applied to any existing anomaly detection algorithm.

Referring now to FIG. 1, shown is a diagram of an example environment 100 in which devices, systems, and/or methods, described herein, may be implemented. As shown in FIG. 1, environment 100 includes anomaly detection system 102, entity database device 104, user device 106, and communication network 108. Anomaly detection system 102, entity database device 104, and/or user device 106 may interconnect (e.g., establish a connection to communicate) via wired connections, wireless connections, or a combination of wired and wireless connections.

Anomaly detection system 102 may include one or more devices configured to communicate with entity database device 104 and/or user device 106 via communication network 108. For example, anomaly detection system 102 may include a server, a group of servers, and/or other like devices. In some non-limiting embodiments or aspects, anomaly detection system 102 may be associated with a transaction service provider system, as described herein. Additionally or alternatively, anomaly detection system 102 may generate (e.g., train, validate, retrain, and/or the like), store, and/or implement (e.g., operate, provide inputs to and/or outputs from, and/or the like) one or more machine learning models. In some non-limiting embodiments or aspects, anomaly detection system 102 may be in communication with a data storage device, which may be local or remote to anomaly detection system 102. In some non-limiting embodiments or aspects, anomaly detection system 102 may be capable of receiving information from, storing information in, transmitting information to, and/or searching information stored in the data storage device.

Entity database device 104 may include one or more devices configured to communicate with anomaly detection system 102 and/or user device 106 via communication network 108. For example, entity database device 104 may include a computing device, such as a server, a group of servers, and/or other like devices. In some non-limiting embodiments or aspects, entity database device 104 may be associated with a transaction service provider system as discussed herein. In some non-limiting embodiments or aspects, time series analysis system may be a component of entity database device 104.

User device 106 may include a computing device configured to communicate with anomaly detection system 102 and/or entity database device 104 via communication network 108. For example, user device 106 may include a computing device, such as a desktop computer, a portable computer (e.g., tablet computer, a laptop computer, and/or the like), a mobile device (e.g., a cellular phone, a smartphone, a personal digital assistant, a wearable device, and/or the like), and/or other like devices. In some non-limiting embodiments or aspects, user device 106 may be associated with a user (e.g., an individual operating user device 106).

Communication network 108 may include one or more wired and/or wireless networks. For example, communication network 108 may include a cellular network (e.g., a long-term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN) and/or the like), a private network, an ad hoc network, an intranet, the Internet, a fiber optic-based network, a cloud computing network, and/or the like, and/or a combination of some or all of these or other types of networks.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally or alternatively, a set of devices (e.g., one or more devices) of environment 100 may perform one or more functions described as being performed by another set of devices of environment 100.

Figure 2:
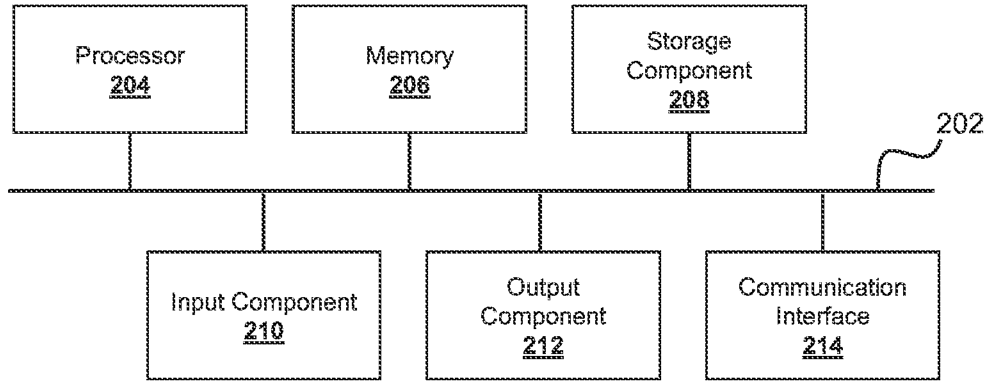
FIG. 2 is a diagram of a non-limiting embodiment or aspect of components of one or more devices of FIG. 1.

Referring now to FIG. 2, shown is a diagram of example components of a device 200. Device 200 may correspond to anomaly detection system 102 (e.g., one or more devices of anomaly detection system 102), entity database device 104 (e.g., one or more devices of entity database device 104), and/or user device 106. In some non-limiting embodiments or aspects, anomaly detection system 102, entity database device 104, and/or user device 106 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments or aspects, processor 204 may be implemented in hardware, firmware, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage memory (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software. The term "configured to," as used herein, may refer to an arrangement of software, device(s), and/or hardware for performing and/or enabling one or more functions (e.g., actions, processes, steps of a process, and/or the like). For example, "a processor configured to" may refer to a processor that executes software instructions (e.g., program code) that cause the processor to perform one or more functions.

The number and arrangement of components shown in FIG. 2 are provided as an example. In some non-limiting embodiments or aspects, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
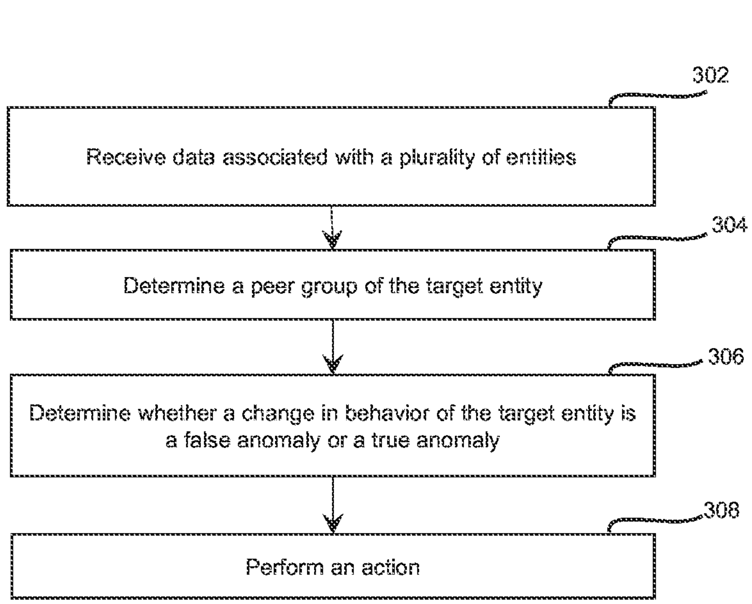
FIG. 3 is a flowchart of a non-limiting embodiment or aspect of a process for dynamic peer group analysis of systematic changes in large scale data.

Referring now to FIG. 3, shown is a flowchart of a non-limiting embodiment or aspect of a process 300 for dynamic peer group analysis for systematic changes in large scale data. In some non-limiting embodiments or aspects, one or more of the steps of process 300 may be performed (e.g., completely, partially, etc.) by anomaly detection system 102 (e.g., one or more devices of anomaly detection system 102). In some non-limiting embodiments or aspects, one or more of the steps of process 300 may be performed (e.g., completely, partially, etc.) by another device or a group of devices separate from or including anomaly detection system 102 (e.g., one or more devices of anomaly detection system 102), entity database device 104 (e.g., one or more devices of entity database device 104), and/or user device 106.

As shown in FIG. 3, at step 302, process 300 includes receiving data associated with a plurality of entities. For example, anomaly detection system 102 may receive data associated with a plurality of entities from entity database device 104. In some non-limiting embodiments or aspects, the data may include a static characteristic of each entity of the plurality of entities, a dynamic characteristic of each entity of the plurality of entities, and a risk score of each entity of the plurality of entities. In some non-limiting embodiments or aspects, the risk score of each entity of the plurality of entities may indicate a probability of an anomaly occurring with regard to a behavior of that entity.

In some non-limiting embodiments or aspects, anomaly detection system 102 may generate a relational graph based on the static characteristic of each entity of the plurality of entities. In some non-limiting embodiments or aspects, the relational graph may include a plurality of nodes and a plurality of edges. In some non-limiting embodiments or aspects, each node may represent an entity of the plurality of entities. In some non-limiting embodiments or aspects, each edge may be associated with a static characteristic that is shared between two nodes of the plurality of nodes connected by that edge.

In some non-limiting embodiments or aspects, anomaly detection system 102 may determine a temporal sequence of a value of a dynamic characteristic over a period of time for each entity of the plurality of entities. In some non-limiting embodiments or aspects, anomaly detection system 102 may determine a length of an edge connecting a first node associated with a first entity and a second node associated with a second entity. For example, anomaly detection system 102 may determine a length of an edge connecting a first node associated with a first entity and a second node associated with a second entity based on the temporal sequences of the first and second entities represented by the first and second nodes. In some non-limiting embodiments or aspects, the length of the edge connecting the two nodes may include an indication of a degree of similarity with regard to a dynamic characteristic between the temporal sequence of the first entity and the temporal sequence of the second entity. In some non-limiting embodiments or aspects, anomaly detection system 102 may generate the relational graph based on the length of the edge connecting the first node associated with the first entity and the second node associated with the second entity. In some non-limiting embodiments or aspects, anomaly detection system 102 may select a target entity from the plurality of entities. The target node may represent the target entity.

As shown in FIG. 3, at step 304, process 300 includes determining a peer group of the target entity. For example, anomaly detection system 102 may determine a peer group of the target entity based on the relational graph. In some non-limiting embodiments or aspects, the plurality of nodes may be a first plurality of nodes. In some non-limiting embodiments or aspects, anomaly detection system 102 may sort a second plurality of nodes. In some non-limiting embodiments or aspects, the second plurality of nodes may be a subset of nodes of the first plurality of nodes. In some non-limiting embodiments or aspects, the subset of nodes may comprise nodes that represent a plurality of entities that share a first static characteristic with the target entity. In some non-limiting embodiments or aspects, anomaly detection system 102 may sort the second plurality of nodes based on a length of an edge connecting the target node to each of the second plurality of nodes to provide a sorted second plurality of nodes. In some non-limiting embodiments or aspects, anomaly detection system 102 may determine the peer group of the target entity based on the sorted second plurality of nodes.

In some non-limiting embodiments or aspects, anomaly detection system 102 may calculate an average of the risk scores of the peer group and/or a standard deviation of the risk scores of the peer group.

In some non-limiting embodiments or aspects, anomaly detection system 102 may determine whether a systematic change in the behavior in the peer group has occurred based on the average of the risk scores of the peer group and the standard deviation of the risk scores of the peer group. In some non-limiting embodiments or aspects, anomaly detection system 102 may generate a ratio of the average of the risk scores of the peer group to the standard deviation of the risk scores of the peer group. In some non-limiting embodiments or aspects, anomaly detection system 102 may determine whether the ratio satisfies a threshold value. In some non-limiting embodiments or aspects, anomaly detection system 102 may determine that a systematic change in the behavior in the peer group has occurred based on the ratio satisfying the threshold value. Additionally or alternatively, anomaly detection system 102 may determine that a systematic change in the behavior in the peer group has not occurred based on the ratio not satisfying the threshold value.

As shown in FIG. 3, at step 306, process 300 includes determining whether a change in behavior of the target entity is a false anomaly or a true anomaly. For example, anomaly detection system 102 may determine whether a change in behavior of the target entity is a false anomaly or a true anomaly based on determining that a systematic change in the behavior in the peer group has occurred. In some non-limiting embodiments or aspects, anomaly detection system 102 may determine that the change in the behavior of the target entity is a false anomaly based on determining that a systematic change in the behavior of the peer group has occurred.

As shown in FIG. 3, at step 308, process 300 includes performing an action. For example, anomaly detection system 102 may perform an action based on determining whether the change in behavior of the target entity is a false anomaly or a true anomaly. In some non-limiting embodiments or aspects, anomaly detection system 102 may perform the action based on determining that the change in behavior of the target entity is a false anomaly. In some non-limiting embodiments or aspects, anomaly detection system 102 may modify an anomaly detection alert associated with the target entity based on determining that the change in the behavior of the target entity is a false anomaly. Additionally or alternatively, anomaly detection system 102 may transmit an anomaly detection alert associated with the target entity based on determining that the change in the behavior of the target entity is a false anomaly.

Referring now to FIGS. 4A-4H, FIGS. 4A-4H are diagrams of non-limiting embodiments or aspects of an implementation 400 of a process (e.g., process 300) for dynamic peer group analysis of systematic changes in large scale data. As illustrated in FIGS. 4A-4H, implementation 400 may include anomaly detection system 102 performing the steps of a process (e.g., a process that is the same or similar to process 300). In some non-limiting embodiments or aspects, one or more of the steps of the process may be performed (e.g., completely, partially, etc.) by another device or a group of devices separate from or including anomaly detection system 102 (e.g., one or more devices of anomaly detection system 102), such as entity database device 104 (e.g., one or more devices of entity database device 104) and/or user device 106.

Figure 4A:
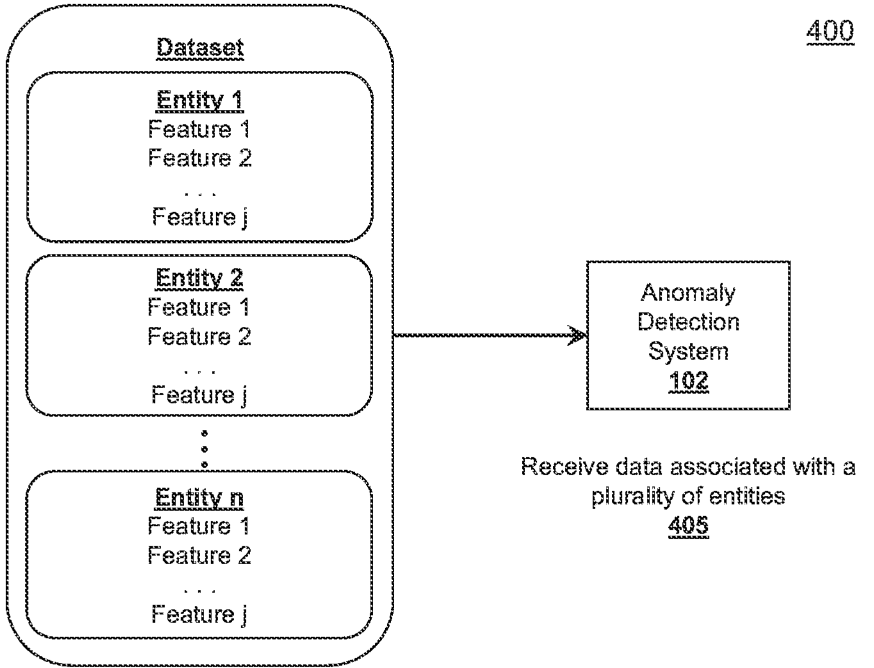
FIGS. 4A-4H are diagrams of non-limiting embodiments or aspects of an implementation of a process for dynamic peer group analysis of systematic changes in large scale data.

As shown by reference number 405 in FIG. 4A, anomaly detection system 102 may receive data associated with a plurality of entities (e.g., entity 1, entity 2, . . . , entity n). In some non-limiting embodiments or aspects, anomaly detection system 102 may receive a plurality of features (e.g., characteristics) for each entity of the plurality of entities (e.g., entity 1, entity 2, . . . , entity n). For example, anomaly detection system 102 may receive a static characteristic of each entity of the plurality of entities, a dynamic characteristic of each entity of the plurality of entities, and/or a risk score of each entity of the plurality of entities (e.g., feature 1, feature 2, . . . , feature j) from entity database device 104 (not shown).

In some non-limiting embodiments or aspects, the risk score of each entity of the plurality of entities may indicate a probability of an anomaly occurring with regard to a behavior of that entity.

In some non-limiting embodiments or aspects, the dynamic characteristic of each entity of the plurality of entities may include one or more multivariate time sequences.

In some non-limiting embodiments or aspects, the data may include a set of entities (e.g., entity vectors) denoted by, $V(D,S)=\{v0, \ldots, vn-1\}$, where D represents the dynamic characteristic(s) for each entity of the plurality of entities and where S represents the static characteristic(s) for each entity of the plurality of entities. In some non-limiting embodiments or aspects, anomaly detection system 102 may receive the set of entities denoted by, $V(D,S)=\{v0, \ldots, vn-1\}$, as an input.

Figure 4B:
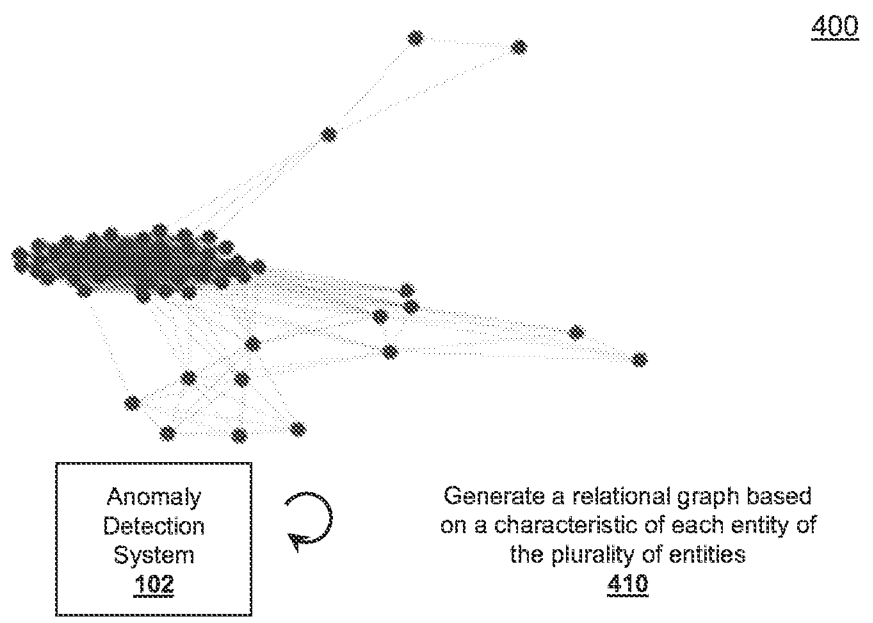
Figure 4C:
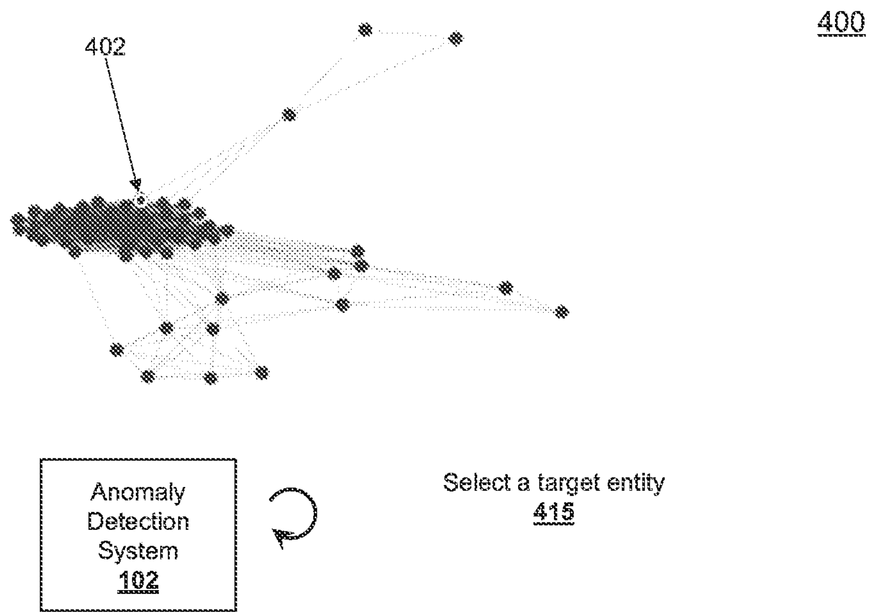

As shown by reference number 410 in FIG. 4B, anomaly detection system 102 may generate a relational graph based on the characteristics (e.g., static and/or dynamic) of each entity of the plurality of entities. For example, anomaly detection system 102 may generate a relational graph based on the static characteristic of each entity of the plurality of entities and/or the dynamic characteristic of each entity of the plurality of entities.

In some non-limiting embodiments or aspects, the relational graph may include graph data. The graph data may be used to identify patterns (e.g., cycles, triangles, etc.) in the data received by anomaly detection system 102.

In some non-limiting embodiments or aspects, the relational graph may comprise a plurality of nodes. For example, each node of the plurality of nodes may represent an entity of the plurality of entities. In some non-limiting embodiments or aspects, the relational graph may comprise a plurality of edges. Each edge may be associated with a static characteristic that is shared between two nodes of the plurality of nodes connected by that edge.

In some non-limiting embodiments or aspects, anomaly detection system 102 may determine a temporal sequence of a value of a dynamic characteristic over a period of time for each entity of the plurality of entities. In some non-limiting embodiments or aspects, anomaly detection system 102 may determine a length of an edge connecting a first node of the plurality of nodes associated with a first entity of the plurality of entities and a second node of the plurality of nodes associated with a second entity of the plurality of entities. For example, anomaly detection system 102 may determine the length of the edge connecting the first node associated with the first entity and the second node associated with the second entity based on the temporal sequence of the value of the dynamic characteristic over the period of time for the first and second entities represented by the first and second nodes. In some non-limiting embodiments or aspects, the length of the edge connecting the first node associate with the first entity and the second node associated with the second entity may include an indication of a degree of similarity with regard to the dynamic characteristic between the temporal sequence of the first entity and the temporal sequence of the second entity.

some characteristics of the temporal sequence of the first entity and/or the temporal sequence of the second entity may vary in speed.

In some non-limiting embodiments or aspects, anomaly detection system 102 may compare one or more of the edge weights. For example, a first edge weight that is higher than a second edge weight may indicate a degree of similarity between two entities connected by that edge.

In some non-limiting embodiments or aspects, even if the first entity and the second entity are initially connected by an edge, the two entities can be disconnected (e.g., the edge may be removed) by assigning a large edge weight to the edge in a case where the first entity behaves differently than the second entity. In some non-limiting embodiments or aspects, the DTW algorithm may generate a sparse graph which may be scalable on an entity-level by modifying edge weights on the graph. In some non-limiting embodiments or aspects, the DTW algorithm may determine the edge weights for another edge (e.g., a neighboring edge) based on the edge connecting the first entity and the second entity.

In some non-limiting embodiments or aspects, anomaly detection system 102 may generate the relational graph, denoted by G[i,j], of the first entity, i, and the second entity, j, using the DTW algorithm, where $v_i$ is a vector for the first entity, i, and where $v_j$ is a vector for the second entity, j, based on the following:

$$G[i, j] = \begin{cases} DTW(v_i, v_j), & \text{if entity } i \text{ and entity } j \text{ share predefined subset of static features} \\ 0, & \text{otherwise} \end{cases}$$

In some non-limiting embodiments or aspects, anomaly detection system 102 may generate the relational graph based on the length of the edge connecting the first node associated with the first entity and the second node associated with the second entity.

In some non-limiting embodiments or aspects, anomaly detection system 102 may generate the relational graph, denoted by G(V,E,W), where E is an edge, and W is an edge weight.

In some non-limiting embodiments or aspects, an algorithm used to generate the relational graph may be scalable on the entity level (e.g., dynamically). In some non-limiting embodiments or aspects, instead of generating all edges, anomaly detection system 102 may use the static characteristics (e.g., static, prior known knowledge) to determine edge-existence between nodes. For example, if a first entity, denoted by i, and a second entity, denoted by j, share a selected number of static characteristics, S, and/or a type of static characteristic, S, then the two entities may be connected by an edge on the relational graph.

In some non-limiting embodiments or aspects, anomaly detection system 102 may assign an edge weight to an edge. For example, anomaly detection system 102 may assign an edge weight, $w_{ij}$, to the edge connecting the first entity, i, and the second entity, j, based on the dynamic characteristics, D. In some non-limiting embodiments or aspects, when assigning the edge weight, anomaly detection system 102 may calculate the distance between the first entity and the second entity by using a Dynamic Time Warping (DTW) algorithm. In some non-limiting embodiments or aspects, the DTW algorithm may measure a similarity between the temporal sequence of the first entity and the temporal sequence of the second entity. In some non-limiting embodiments or aspects, As shown by reference number 415 in FIG. 4C, anomaly detection system 102 may select a target entity. For example, anomaly detection system 102 may select the target entity from the plurality of entities.

In some non-limiting embodiments or aspects, anomaly detection system 102 may select a target node from the plurality of nodes. For example, anomaly detection system 102 may select target node 402 from the plurality of nodes on the relational graph where target node 402 represents the target entity.

In some non-limiting embodiments or aspects, the plurality of nodes on the relation graph may be a first plurality of nodes. In some non-limiting embodiments or aspects, a second plurality of nodes may be a subset of nodes of the first plurality of nodes. In some non-limiting embodiments or aspects, the subset of nodes may include nodes that represent a plurality of entities that share a characteristic with the target entity. For example, the subset of nodes may include nodes that represent a plurality of entities that share a static characteristic with the target entity. In some non-limiting embodiments or aspects, anomaly detection system 102 may determine which entities of the plurality of entities share at least one static characteristic with the target entity. For example, anomaly detection system 102 may determine which entities of the first plurality of entities share at least one static characteristic with the target entity based on the relational graph. In some non-limiting embodiments or aspects, anomaly detection system 102 may determine which entities of the first plurality of entities share at least one static characteristic with the target entity based on determining which nodes of the first plurality of nodes are connected to target node 402 by an edge.

Figure 4D:
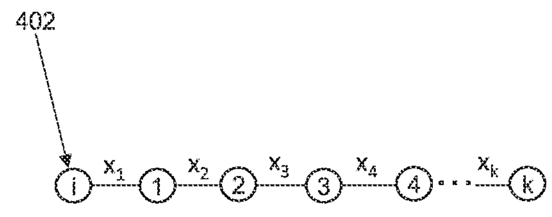
Figure 4D:

As shown by reference number 420 in FIG. 4D, anomaly detection system 102 may sort nodes that share a first static characteristic with the target entity to provide a sorted plurality of nodes. As shown in FIG. 4D, target node 402 may be node i and the second plurality of nodes may include nodes 1–k, where k is a number of nodes connected by an edge to target node 402.

In some non-limiting embodiments or aspects, anomaly detection system 102 may sort the second plurality of nodes (e.g., nodes 1–k). For example, anomaly detection system 102 may sort the second plurality of nodes (e.g., nodes 1–k) that share the first static characteristic with the target entity represented by target node 402 (e.g., node i) to provide a sorted plurality of nodes (e.g., nodes 1, 2, 3, 4, . . . k). In some non-limiting embodiments or aspects, the second plurality of nodes may be sorted in ascending order and enumerated (e.g., from 1 to k).

In some non-limiting embodiments or aspects, anomaly detection system 102 may determine a length of the edge (e.g., $x_1$-$x_k$) connecting the target node (e.g., node i) to each of the second plurality of nodes (e.g., nodes 1–k). In some non-limiting embodiments or aspects, when sorting the second plurality of nodes (e.g., nodes 1–k), anomaly detection system 102 may sort the second plurality of nodes (e.g., nodes 1–k) based on the length (e.g., $x_1$-$x_k$) of the edge connecting the target node (e.g., node i) to each of the second plurality of nodes to provide the sorted plurality of nodes (e.g., nodes 1–k).

In some non-limiting embodiments or aspects, for a target entity, denoted by 0, an edge weight, $w_{0j}$, may be calculated for all other nodes connected to the target node. In some non-limiting embodiments or aspects, a gap metric may be defined based on the following, where f is a trainable or simple function, such as a difference of edge weights, $f(w_{0j}, w_{0(j-1)})=w_{0j}-w_{0(j-1)}$:

$$x_j = f(w_{0j}, w_{0(j-1)})\forall\ j \in \{1, \ldots, k\},\ w_{00} = 0$$

In some non-limiting embodiments or aspects, the number of nodes, k, may be predefined. Additionally or alternatively, the number of nodes, k, may be selected dynamically. In some non-limiting embodiments or aspects, anomaly detection system 102 may select a number of nodes, k, based on the calculated edge weights, $w_{0j}$, for each of the second plurality of nodes. For example, the number of nodes, k, may be dynamically selected based on calculating the edge weight, $w_{0j}$, for each of the second plurality of nodes.

Figure 4E:
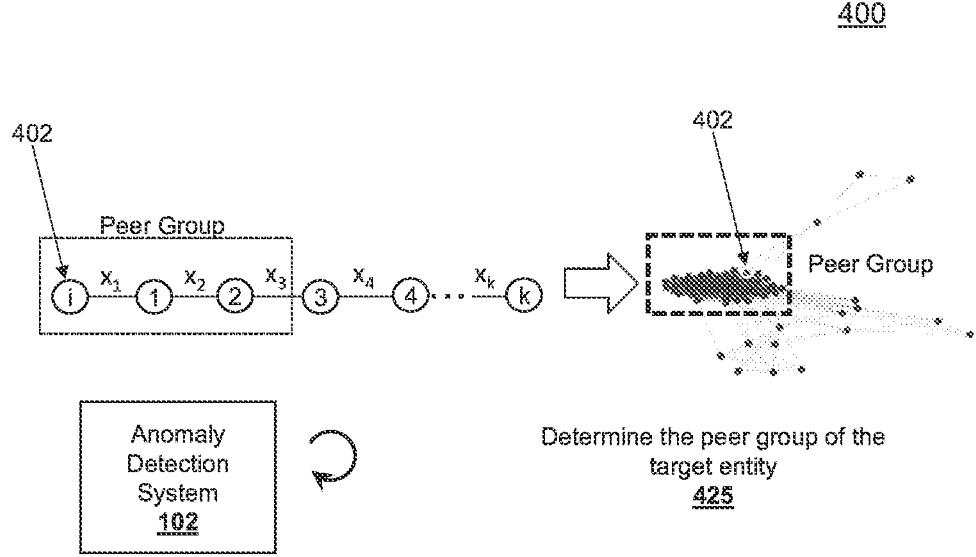

As shown by reference number 425 in FIG. 4E, anomaly detection system 102 may determine the peer group of the target entity. For example, anomaly detection system 102 may determine the peer group of the target entity based on the relational graph. In some non-limiting embodiments or aspects, anomaly detection system 102 may determine the peer group of the target entity based on the sorted second plurality of nodes (e.g., nodes 1–k).

In some non-limiting embodiments or aspects, anomaly detection system 102 may determine the peer group of the target entity based on calculating the gap metric, $x_j$. For example, anomaly detection system 102 may select the maximum gap, j', to determine which nodes of the number of nodes, k, belong to the peer group of the target entity based on the following, where $\hat{k}$ is a given parameter for the minimum size of the peer group:

$$j' = \text{argmax} x_i$$

$$x_{j-1} < x_j < x_{j+1}$$

$$j > \hat{k}$$

In some non-limiting embodiments or aspects, when determining the peer group of the target entity, anomaly detection system 102 may apply an algorithm (e.g., a Dynamic Peer Grouping algorithm) to each entity of the plurality of entities, separately. In some non-limiting embodiments or aspects, the second algorithm may be applied to each entity of the plurality of entities in parallel (e.g., at the same time).

Figure 4F:
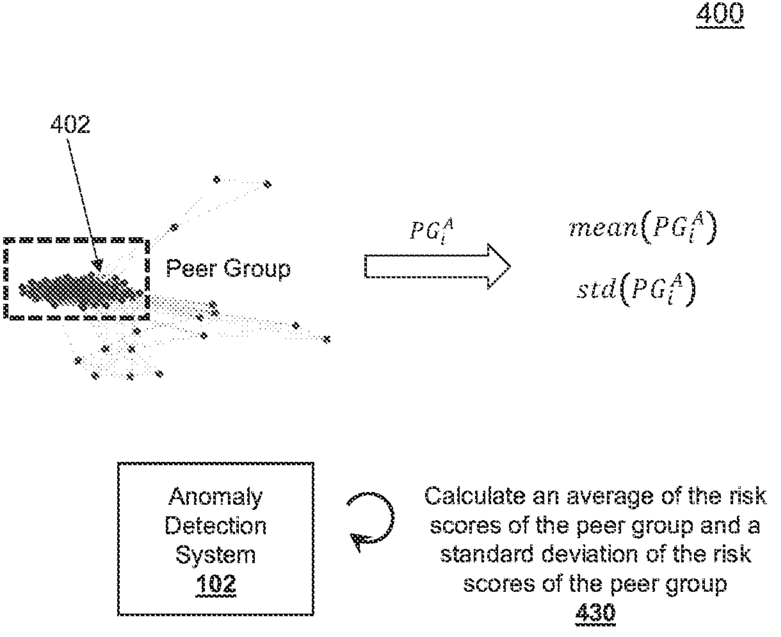

As shown by reference number 430 in FIG. 4F, anomaly detection system 102 may calculate an average of the risk scores of the peer group and/or a standard deviation of the risk scores of the peer group.

In some non-limiting embodiments or aspects, anomaly detection system 102 may calculate the average of the risk scores of the peer group based on the following equation, where $$PG_i^A$$

represents all scores for the peer group for entity i:

$$\text{mean}(PG_i^A)$$

In some non-limiting embodiments or aspects, anomaly detection system 102 may calculate the standard deviation of the risk scores of the peer group based on the following equation, where $$PG_i^A$$

represents all scores for the peer group for entity i:

$$std(PG_i^A)$$

Figure 4G:
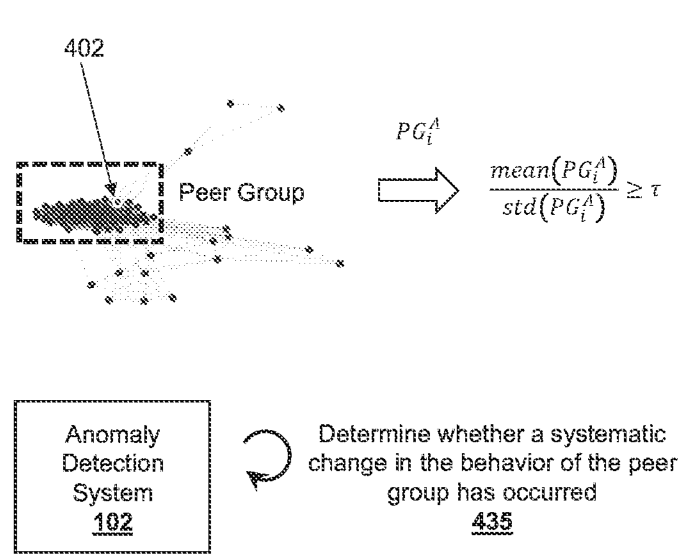

As shown by reference number 435 in FIG. 4G, anomaly detection system 102 may determine whether a systematic change in behavior of the peer group has occurred. For example, anomaly detection system 102 may determine whether a systematic change in the behavior of the peer group has occurred based on the average of the risk scores of the peer group, $$\text{mean}(PG_i^A),$$

and the standard deviation of the risk score of the peer group, $$std(PG_i^A).$$

In some non-limiting embodiments or aspects, anomaly detection system 102 may generate a ratio of the average of the risk scores of the peer group, $$\mathrm{mean}(PG_i^A),$$

and the standard deviation of the risk score of the peer group, $$std(PG_i^A).$$

In some non-limiting embodiments or aspects, anomaly detection system 102 may determine whether the ratio satisfies a threshold value. In some non-limiting embodiments or aspects, anomaly detection system 102 may determine whether a systematic change in behavior of the peer group have occurred. For example, anomaly detection system 102 may determine that a systematic change in the behavior in the peer group has occurred based on determining that the ratio satisfies the threshold value. In some non-limiting embodiments or aspects, anomaly detection system 102 may determine that a systematic change in the behavior in the peer group has not occurred based on determining that the ratio does not satisfy the threshold value. In some non-limiting embodiments or aspects, the threshold value may be a predetermined value.

Figure 4H:
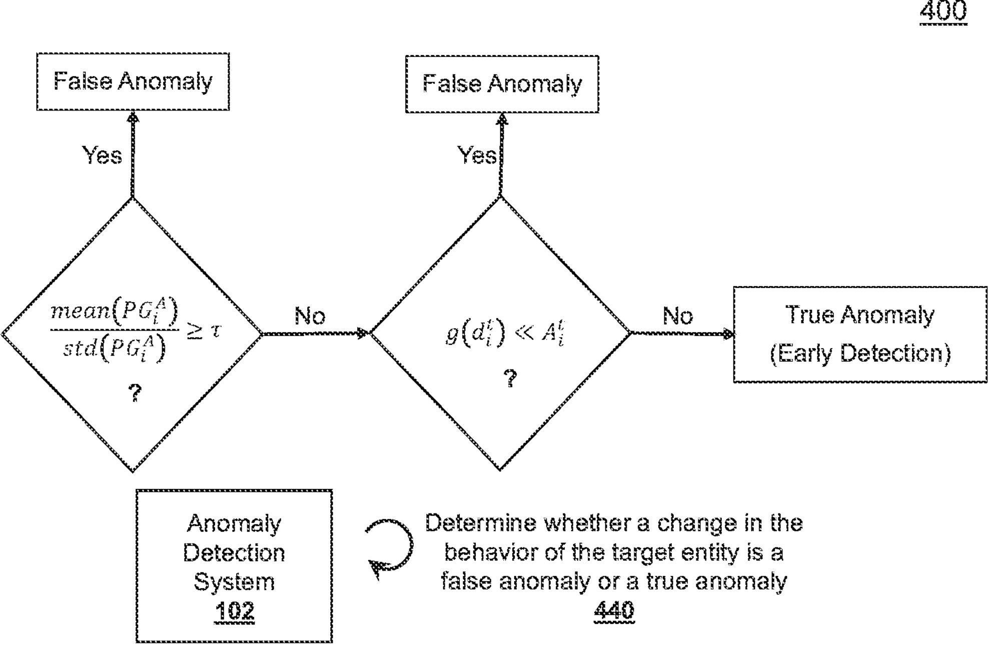

As shown by reference number 440 in FIG. 4H, anomaly detection system 102 may determine whether a change in the behavior of the target entity is a false anomaly (e.g., an anomaly detected that is not predicted to be acting fraudulently) or a true anomaly (e.g., an anomaly detected that is predicted to be acting fraudulently).

In some non-limiting embodiments or aspects, anomaly detection system 102 may detect an anomaly (e.g., a false anomaly and/or a true anomaly). In some non-limiting embodiments or aspects, anomaly detection system 102 may determine whether the detected anomaly is a false anomaly or a true anomaly. For example, anomaly detection system 102 may determine whether the detected anomaly is a false anomaly and/or a true anomaly based on a systematic change in the behavior of the peer group and/or a change in a behavior of the target entity.

In some non-limiting embodiments or aspects, anomaly detection system 102 may determine whether a change in behavior of the target entity is a false anomaly or a true anomaly based on determining whether a systematic change in the behavior in the peer group has occurred. For example, anomaly detection system 102 may determine that the change in the behavior of the target entity is a false anomaly based on determining that a systematic change in the behavior in the peer group has occurred. Additionally or alternatively, anomaly detection system 102 may determine that the change in the behavior of the target entity is a true anomaly based on determining that a systematic change in the behavior in the peer group has not occurred.

In some non-limiting embodiments or aspects, anomaly detection system 102 may determine whether a systematic change in the behavior in the peer group has occurred based on the average of the risk scores of the peer group and/or the standard deviation of the risk scores of the peer group. In some non-limiting embodiments or aspects, anomaly detection system 102 may determine whether the ratio of the average of the risk scores of the peer group, $$\mathrm{mean}(PG_i^A),$$

and the standard deviation of the risk score of the peer group, $$std(PG_i^A),$$

satisfies the threshold value. In some non-limiting embodiments or aspects, if anomaly detection system 102 determines that the ratio of the average of the risk scores of the peer group, $$\mathrm{mean}(PG_i^A),$$

and the standard deviation of the risk score of the peer group, $$std(PG_i^A),$$

satisfies the threshold value, then anomaly detection system 102 may determine that the change in the behavior of the target entity is a false anomaly.

In some non-limiting embodiments or aspects, if anomaly detection system 102 determines that the ratio of the average of the risk scores of the peer group, $$\mathrm{mean}(PG_i^A),$$

and the standard deviation of the risk score of the peer group, $$std(PG_i^A),$$

does not satisfy the threshold value, then anomaly detection system 102 may perform a score adjustment.

In some non-limiting embodiments or aspects, anomaly detection system 102 may determine a value of $$A_i^t,$$

where $$A_i^t$$

is an anomaly score of entity, i, at time, t which may be calculated based on the following, where AD is an anomaly detection algorithm:

$$A_i^t = AD(v_i^t),$$

In some non-limiting embodiments or aspects, the anomaly detection algorithm, AD, may have a second threshold value, T. Using the anomaly detection algorithm, AD, anomaly detection system 102 may determine whether entity, i has an anomaly at time, t. For example, if the anomaly score, $$A_i^t,$$

satisfies the second threshold value, T, then an anomaly (e.g., a false anomaly and/or a true anomaly) may be predicted according to the function AD.

In some non-limiting embodiments or aspects, anomaly detection system 102 determine whether an entity has deviated from its peer group. For example, anomaly detection system 102 may calculate a deviation, $$d_i^t,$$

of entity, i, from its peer group based on the following:

$$d_i^t = \frac{A_i^t - \text{mean}\left(PG_i^A\right)}{std\left(PG_i^A\right)}$$

For example, if the calculated deviation, $$d_i^t,$$

is small (e.g., close to zero), anomaly detection system 102 may determine that entity, i, behaves similarly to the peer group. In some non-limiting embodiments or aspects, anomaly detection system 102 may determine that a change in behavior of entity, i, is a false anomaly based on determining that entity, i, behaves similarly to the peer group.

In some non-limiting embodiments or aspects, if the calculated deviation, $$d_i^t,$$

is small and $$A_i^t > T,$$

then anomaly detection system 102 determine that a detected anomaly is a false anomaly. In some non-limiting embodiments or aspects, if the calculated deviation, $$d_i^t,$$

is large and $$A_i^t < T,$$

then anomaly detection system 102 may determine that the detected anomaly is a true anomaly and/or an early detection of a true anomaly.

In some non-limiting embodiments or aspects, a true anomaly may have a calculated deviation, $$d_i^t,$$

that is consistent with anomaly score, $$A_i^t.$$

In some non-limiting embodiments or aspects, a function, $$g(d_i^t),$$

may be used to adjust the values of calculated deviation, $$d_i^t,$$

based on the anomaly score, $$A_i^t,$$

and perform the score adjustment. In some non-limiting embodiments or aspects, the function, $$g(d_i^t),$$

may be a trainable function. In some non-limiting embodiments or aspects, when all entities in a peer group have a high anomaly score, $$A_i^t,$$

(e.g., a mean of the peer group scores is higher than the standard deviation of the peer group scores) then anomaly detection system may determine a false anomaly. In some non-limiting embodiments or aspects, when all entities in a peer group do not have a high anomaly score, $$A_i^t,$$

(e.g., a mean of the peer group scores is not higher than the standard deviation of the peer group scores) then anomaly detection system may determine whether the adjusted score, $$g(d_i^t),$$

is higher or lower than the anomaly score, $$A_i^t.$$

For example, anomaly detection system 102 may determine whether a change in the behavior of the entity, i, is a false anomaly or a true anomaly based on the following:

$$\text{Entity}_i^t = \begin{cases} \text{False Anomaly}, & \text{if } g(d_i^t) \ll A_i^t \\ \text{Early Detection}, & \text{if } (d_i^t) \gg A_i^t \\ \text{No Correction}, & \text{Otherwise} \end{cases}$$

In some non-limiting embodiments or aspects, a loss function may be defined based on one or more terms. In some non-limiting embodiments or aspects, the one or more terms may include: an adjustment term, a stability term, and/or a ranking term.

In some non-limiting embodiments or aspects, anomaly detection system 102 may adjust the calculated deviation, $$d_i^t,$$

as close to the anomaly scores, $$A_i^t.$$

For example, the adjustment term may be calculated based on:

$$\|g(d_i^t) - A_i^t\|_2$$

In some non-limiting embodiments or aspects, the stability term may be used to keep a deviation value over a time stable by minimizing consecutive deviation values. For example, the stability term may be calculated based on:

$$\left\|d_i^t - d_i^{t-1}\right\|_2$$

In some non-limiting embodiments or aspects, the ranking term may be used to compare ranks across peer groups. In some non-limiting embodiments or aspects, a loss of a deviation of a known anomaly (e.g., a true anomaly) may be ranked. For example, the ranking term may be calculated based on:

$$\text{Rank}(d_i^t)$$

In some non-limiting embodiments or aspects, nodes may be ranked based on their distance from the target entity node. In some non-limiting embodiments or aspects, rank may be determined based on a static characteristic. In some non-limiting embodiments or aspects, a ranking metric for comparison of two or more peer groups may be calculated based on:

$$R(PG_i^t, v_i^t) = \frac{\text{Ranking Average over Matched}}{\text{Number of Matched}}$$

In some non-limiting embodiments or aspects, the ranking term may be omitted where there are no known anomalies.

In some non-limiting embodiments or aspects, anomaly detection system 102 may perform an action based on determining whether the change in behavior of the target entity is a false anomaly or a true anomaly. For example, anomaly detection system 102 may perform the action based on determining that the change in the behavior of the target entity is a false anomaly. In some non-limiting embodiments or aspects, anomaly detection system 102 may modify an anomaly detection alert associated with the target entity based on determining that the change in the behavior of the target entity is a false anomaly. Additionally or alternatively, anomaly detection system 102 may transmit an anomaly detection alert associated with the target entity based on determining that the change in the behavior of the target entity is a false anomaly.

Although the present disclosure has been described in detail for the purpose of illustration based on what is currently considered to be the most practical and preferred embodiments or aspects, it is to be understood that such detail is solely for that purpose and that the present disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A method comprising:

receiving, with at least one processor, data associated with a plurality of entities, wherein the data comprises a static characteristic of each entity of the plurality of entities, a dynamic characteristic of each entity of the plurality of entities, and a risk score of each entity of the plurality of entities, and wherein the risk score of each entity of the plurality of entities indicates a probability of an anomaly occurring with regard to a behavior of that entity;

generating, with the at least one processor, a relational graph based on the static characteristic of each entity of the plurality of entities, the relational graph comprising a plurality of nodes and a plurality of edges, wherein each node represents an entity of the plurality of entities, and wherein each edge is associated with a static characteristic that is shared between two nodes of the plurality of nodes connected by that edge;

selecting, with the at least one processor, a target entity from the plurality of entities by selecting a target node from the plurality of nodes on the relational graph, wherein the target node represents the target entity, and wherein the target entity comprises a first static characteristic;

determining, with the at least one processor, a peer group of the target entity based on the relational graph and the first static characteristic, wherein the peer group comprises a subset of the plurality of nodes, and wherein the subset of the plurality of nodes represents a subset of the plurality of entities that share the first static characteristic with the target entity;

calculating, with the at least one processor, an average of the risk scores of the peer group and a standard deviation of the risk scores of the peer group;

determining, with the at least one processor, whether a systematic change in the behavior in the peer group has occurred based on the average of the risk scores of the peer group and the standard deviation of the risk scores of the peer group, wherein determining whether a systematic change in the behavior in the peer group has occurred comprises:

generating a ratio of the average of the risk scores of the peer group to the standard deviation of the risk scores of the peer group;

determining whether the ratio satisfies a threshold value; and determining that a systematic change in the behavior in the peer group has occurred based on the ratio satisfying the threshold value;

determining, with the at least one processor, whether a change in behavior of the target entity is a false anomaly or a true anomaly based on determining that a systematic change in the behavior in the peer group has occurred; and performing, with the at least one processor, an action based on determining whether the change in behavior of the target entity is a false anomaly or a true anomaly.

2. The method of claim 1, further comprising:

determining a temporal sequence of a value of the dynamic characteristic over a period of time for each entity of the plurality of entities; and determining a length of an edge connecting a first node associated with a first entity and a second node associated with a second entity based on the temporal sequences of the first and second entities represented by the first and second nodes, wherein the length of the edge connecting the two nodes comprises an indication of a degree of similarity with regard to the dynamic characteristic between the temporal sequence of the first entity and the temporal sequence of the second entity; and wherein generating the relational graph comprises:

generating the relational graph based on the length of the edge connecting the first node associated with the first entity and the second node associated with the second entity.

3. The method of claim 1, wherein the plurality of nodes is a first plurality of nodes, and wherein determining the peer group of the target entity comprises:

selecting a target node from the first plurality of nodes, wherein the target node represents the target entity;

sorting a second plurality of nodes, wherein the second plurality of nodes is a subset of nodes of the first plurality of nodes, and wherein sorting the second plurality of nodes comprises:

sorting the second plurality of nodes based on a length of an edge connecting the target node to each of the second plurality of nodes to provide a sorted second plurality of nodes; and determining the peer group of the target entity based on the sorted second plurality of nodes.

4. The method of claim 1, wherein determining whether a systematic change in the behavior in the peer group has occurred comprises:

determining that a systematic change in the behavior in the peer group has not occurred based on the ratio not satisfying the threshold value.

5. The method of claim 1, wherein determining whether the change in behavior of the target entity is a false anomaly or a true anomaly comprises:

determining that the change in the behavior of the target entity is a false anomaly based on determining that a systematic change in the behavior of the peer group has occurred; and wherein performing the action comprises:

performing the action based on determining that the change in behavior of the target entity is a false anomaly.

6. The method of claim 5, wherein performing the action based on determining that the change in behavior of the target entity is a false anomaly comprises:

modifying an anomaly detection alert associated with the target entity based on determining that the change in the behavior of the target entity is a false anomaly; or transmitting an anomaly detection alert associated with the target entity based on determining that the change in the behavior of the target entity is a false anomaly.

7. A system comprising at least one processor programmed or configured to:

receive data associated with a plurality of entities, wherein the data comprises a static characteristic of each entity of the plurality of entities, a dynamic characteristic of each entity of the plurality of entities, and a risk score of each entity of the plurality of entities, and wherein the risk score of each entity of the plurality of entities indicates a probability of an anomaly occurring with regard to a behavior of that entity;

generate a relational graph based on the static characteristic of each entity of the plurality of entities, the relational graph comprising a plurality of nodes and a plurality of edges, wherein each node represents an entity of the plurality of entities, and wherein each edge is associated with a static characteristic that is shared between two nodes of the plurality of nodes connected by that edge;

select a target entity from the plurality of entities by selecting a target node from the plurality of nodes on the relational graph, wherein the target node represents the target entity, and wherein the target entity comprises a first static characteristic;

determine a peer group of the target entity based on the relational graph and the first static characteristic, wherein the peer group comprises a subset of the plurality of nodes, and wherein the subset of the plurality of nodes represent a subset of the plurality of entities that share the first static characteristic with the target entity;

calculate an average of the risk scores of the peer group and a standard deviation of the risk scores of the peer group;

determine whether a systematic change in the behavior in the peer group has occurred based on the average of the risk scores of the peer group and the standard deviation of the risk scores of the peer group, wherein, when determining whether a systematic change in the behavior in the peer group has occurred, the at least one processor is programmed or configured to:

generate a ratio of the average of the risk scores of the peer group to the standard deviation of the risk scores of the peer group;

determine whether the ratio satisfies a threshold value; and determine that a systematic change in the behavior in the peer group has occurred based on the ratio satisfying the threshold value;

determine whether a change in behavior of the target entity is a false anomaly or a true anomaly based on determining that a systematic change in the behavior in the peer group has occurred; and perform an action based on determining whether the change in behavior of the target entity is a false anomaly or a true anomaly.

8. The system of claim 7, wherein the at least one processor is further programmed or configured to:

determine a temporal sequence of a value of the dynamic characteristic over a period of time for each entity of the plurality of entities; and determine a length of an edge connecting a first node associated with a first entity and a second node associated with a second entity based on the temporal sequences of the first and second entities represented by the first and second nodes, wherein the length of the edge connecting the two nodes comprises an indication of a degree of similarity with regard to the dynamic characteristic between the temporal sequence of the first entity and the temporal sequence of the second entity; and wherein, when generating the relational graph, the at least one processor is further programmed or configured to:

generate the relational graph based on the length of the edge connecting the first node associated with the first entity and the second node associated with the second entity.

9. The system of claim 7, wherein the plurality of nodes is a first plurality of nodes, and wherein, when determining the peer group of the target entity, the at least one processor is programmed or configured to:

select a target node from the first plurality of nodes, wherein the target node represents the target entity;

sort a second plurality of nodes, wherein the second plurality of nodes is a subset of nodes of the first plurality of nodes, and wherein, when sorting the second plurality of nodes, the at least one processor is programmed or configured to:

sort the second plurality of nodes based on a length of an edge connecting the target node to each of the second plurality of nodes to provide a sorted second plurality of nodes; and determine the peer group of the target entity based on the sorted second plurality of nodes.

10. The system of claim 7, wherein, when determining whether a systematic change in the behavior in the peer group has occurred, the at least one processor is programmed or configured to:

determine that a systematic change in the behavior in the peer group has not occurred based on the ratio not satisfying the threshold value.

11. The system of claim 7, wherein, when determining whether the change in behavior of the target entity is a false anomaly or a true anomaly, the at least one processor is programmed or configured to:

determine that the change in the behavior of the target entity is a false anomaly based on determining that a systematic change in the behavior of the peer group has occurred; and wherein, when performing the action, the at least one processor is programmed or configured to:

perform the action based on determining that the change in behavior of the target entity is a false anomaly.

12. The system of claim 11, wherein, when performing the action based on determining that the change in behavior of the target entity is a false anomaly, the at least one processor is programmed or configured to:

modify an anomaly detection alert associated with the target entity based on determining that the change in the behavior of the target entity is a false anomaly; or transmit an anomaly detection alert associated with the target entity based on determining that the change in the behavior of the target entity is a false anomaly.

13. A computer program product comprising at least one non-transitory computer-readable medium including one or more instructions that, when executed by at least one processor, cause the at least one processor to:

receive data associated with a plurality of entities, wherein the data comprises a static characteristic of each entity of the plurality of entities, a dynamic characteristic of each entity of the plurality of entities, and a risk score of each entity of the plurality of entities, and wherein the risk score of each entity of the plurality of entities indicates a probability of an anomaly occurring with regard to a behavior of that entity;

generate a relational graph based on the static characteristic of each entity of the plurality of entities, the relational graph comprising a plurality of nodes and a plurality of edges, wherein each node represents an entity of the plurality of entities, and wherein each edge is associated with a static characteristic that is shared between two nodes of the plurality of nodes connected by that edge;

select a target entity from the plurality of entities by selecting a target node from the plurality of nodes on the relational graph, wherein the target node represents the target entity, and wherein the target entity comprises a first static characteristic;

determine a peer group of the target entity based on the relational graph and the first static characteristic, wherein the peer group comprises a subset of the plurality of nodes, and wherein the subset of the plurality of nodes represent a subset of the plurality of entities that share the first static characteristic with the target entity;

calculate an average of the risk scores of the peer group and a standard deviation of the risk scores of the peer group;

determine whether a systematic change in the behavior in the peer group has occurred based on the average of the risk scores of the peer group and the standard deviation of the risk scores of the peer group, wherein the instructions that cause the at least one processor to determine whether a systematic change in the behavior in the peer group has occurred cause the at least one processor to:

generate a ratio of the average of the risk scores of the peer group to the standard deviation of the risk scores of the peer group;

determine whether the ratio satisfies a threshold value; and determine that a systematic change in the behavior in the peer group has occurred based on the ratio satisfying the threshold value;

determine whether a change in behavior of the target entity is a false anomaly or a true anomaly based on determining that a systematic change in the behavior in the peer group has occurred; and perform an action based on determining whether the change in behavior of the target entity is a false anomaly or a true anomaly.

14. The computer program product of claim 13, wherein the one or more instructions further cause the at least one processor to:

determine a temporal sequence of a value of the dynamic characteristic over a period of time for each entity of the plurality of entities; and determine a length of an edge connecting a first node associated with a first entity and a second node associated with a second entity based on the temporal sequences of the first and second entities represented by the first and second nodes, wherein the length of the edge connecting the two nodes comprises an indication of a degree of similarity with regard to the dynamic characteristic between the temporal sequence of the first entity and the temporal sequence of the second entity; and wherein, the one or more instructions that cause the at least one processor to generate the relational graph, further cause the at least one processor to:

generate the relational graph based on the length of the edge connecting the first node associated with the first entity and the second node associated with the second entity.

15. The computer program product of claim 13, wherein the plurality of nodes is a first plurality of nodes, and wherein, when determining the peer group of the target entity, the one or more instructions cause the at least one processor to:

select a target node from the first plurality of nodes, wherein the target node represents the target entity;

sort a second plurality of nodes, wherein the second plurality of nodes is a subset of nodes of the first plurality of nodes, and wherein, the one or more instructions that cause the at least one processor to sort the second plurality of nodes, further cause the at least one processor to:

sort the second plurality of nodes based on a length of an edge connecting the target node to each of the second plurality of nodes to provide a sorted second plurality of nodes; and determine the peer group of the target entity based on the sorted second plurality of nodes.

16. The computer program product of claim 13, wherein, the one or more instructions that cause the at least one processor to determine whether a systematic change in the behavior in the peer group has occurred, further cause the at least one processor to:

determine that a systematic change in the behavior in the peer group has not occurred based on the ratio not satisfying the threshold value.

17. The computer program product of claim 13, wherein the one or more instructions that cause the at least one processor to determine whether the change in behavior of the target entity is a false anomaly or a true anomaly, further cause the at least one processor to:

determine that the change in the behavior of the target entity is a false anomaly based on determining that a systematic change in the behavior of the peer group has occurred; and wherein, the one or more instructions that cause the at least one processor to perform the action, further cause the at least one processor to:

perform the action based on determining that the change in behavior of the target entity is a false anomaly.

18. The computer program product of claim 17, wherein, the one or more instructions that cause the at least one processor to perform the action based on determining that the change in behavior of the target entity is a false anomaly further cause the at least one processor to:

modify an anomaly detection alert associated with the target entity based on determining that the change in the behavior of the target entity is a false anomaly; or transmit an anomaly detection alert associated with the target entity based on determining that the change in the behavior of the target entity is a false anomaly.

* * * * *